(12) United States Patent
Hakoi et al.

(10) Patent No.: US 10,845,648 B2
(45) Date of Patent: Nov. 24, 2020

(54) SWITCHING MIRROR PANEL AND SWITCHING MIRROR DEVICE

(71) Applicant: SHARP KABUSHIKI KAISHA, Sakai (JP)

(72) Inventors: Hiroyuki Hakoi, Sakai (JP); Akira Sakai, Sakai (JP); Kiyoshi Minoura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 168 days.

(21) Appl. No.: 16/090,242

(22) PCT Filed: Mar. 27, 2017

(86) PCT No.: PCT/JP2017/012389
§ 371 (c)(1),
(2) Date: Sep. 29, 2018

(87) PCT Pub. No.: WO2017/170400
PCT Pub. Date: Oct. 5, 2017

(65) Prior Publication Data
US 2019/0113790 A1  Apr. 18, 2019

(30) Foreign Application Priority Data

Mar. 29, 2016 (JP) ................. 2016-066397

(51) Int. Cl.
*G02F 1/1335* (2006.01)
*G02F 1/13357* (2006.01)
(Continued)

(52) U.S. Cl.
CPC ....... *G02F 1/13362* (2013.01); *G02B 5/3033* (2013.01); *G02F 1/1343* (2013.01);
(Continued)

(58) Field of Classification Search
CPC ........ G02B 5/0808; G02B 5/08; G02B 1/105; G02B 1/14; G02B 5/0891; G02B 1/04;
(Continued)

(56) References Cited

U.S. PATENT DOCUMENTS

| 2004/0100598 A1 | 5/2004 | Adachi |
| 2007/0064321 A1 | 3/2007 | Hikmet et al. |

FOREIGN PATENT DOCUMENTS

| JP | 2000-221529 A | 8/2000 |
| JP | 2001-318374 A | 11/2001 |

(Continued)

*Primary Examiner* — Collin X Beatty
*Assistant Examiner* — Grant A Gagnon
(74) *Attorney, Agent, or Firm* — ScienBiziP, P.C.

(57) ABSTRACT

The switching mirror panel of the present invention includes, in the following order: a reflective polarizing plate; a liquid crystal panel including a pair of substrates facing each other and a liquid crystal layer disposed between the substrates; and an absorptive polarizing plate, at least one of the substrates including divided pixel regions, the pixel regions each including, in the following order from the liquid crystal layer side, a pixel electrode, a transparent insulating film, and transparent conductive lines superimposed on the pixel electrode, the pixel electrode being electrically connected to at least one of the transparent conductive lines through an aperture formed in the transparent insulating film, the switching mirror panel being configured to switch between a transparent mode and a mirror mode by applying voltage to the pixel electrode to control the alignment of liquid crystal molecules in the liquid crystal layer.

14 Claims, 14 Drawing Sheets

(51) Int. Cl.
*G02F 1/1343* (2006.01)
*G02F 1/1347* (2006.01)
*G02B 5/30* (2006.01)
*G02F 1/1362* (2006.01)
*G02F 1/1345* (2006.01)

(52) U.S. Cl.
CPC ...... *G02F 1/1347* (2013.01); *G02F 1/133536* (2013.01); *G02F 1/1345* (2013.01); *G02F 1/136227* (2013.01); *G02F 2203/62* (2013.01)

(58) Field of Classification Search
CPC .... G02B 5/10; G02B 19/0042; G02B 5/0816; G02B 1/10; G02B 27/0006; G02B 5/0858; G02B 5/0875; G02B 7/1815; G02B 1/18; G02B 5/00; G02B 5/0284; G02B 5/124; G02B 17/004; G02B 17/0657; G02B 19/0019; G02B 19/0023; G02B 19/0028; G02B 27/0012; G02B 30/56; G02B 5/0833; G02B 5/0866; G02B 5/09; G02B 5/1814; G02B 5/208; G02B 7/008; G02B 7/183; G02B 13/06; G02B 17/00; G02B 17/002; G02B 17/008; G02B 17/0647; G02B 17/0652; G02B 19/0033; G02B 19/0076; G02B 19/0085; G02B 1/00; G02B 1/02; G02B 1/11; G02B 1/12; G02B 2006/12197; G02B 2207/101; G02B 2207/113; G02B 23/12; G02B 23/2492; G02B 26/001; G02B 26/0825; G02B 27/0018; G02B 27/0043; G02B 27/01; G02B 27/0189; G02B 27/0927; G02B 27/0944; G02B 27/095; G02B 27/0977; G02B 27/10; G02B 27/1073; G02B 27/14; G02B 27/144; G02B 27/32; G02B 27/4255; G02B 3/00; G02B 3/0037; G02B 5/008; G02B 5/0247; G02B 5/0257; G02B 5/0825; G02B 5/085; G02B 5/132; G02B 5/136; G02B 5/18; G02B 5/1852; G02B 5/1861; G02B 5/204; G02B 5/28; G02B 5/284; G02B 5/285; G02B 5/286; G02B 5/287; G02B 5/288; G02B 5/3033; G02B 6/00; G02B 6/0001; G02B 6/001; G02B 6/0018; G02B 6/0028; G02B 6/0048; G02B 6/4214; G02B 6/4298; G02B 7/028; G02B 7/182; G02B 7/188; G02B 9/10; G02F 1/157; G02F 1/0036; G02F 1/09; G02F 1/133504; G02F 1/133528; G02F 1/133553; G02F 1/133555; G02F 1/133605; G02F 1/133608; G02F 1/15; G02F 1/161; G02F 1/19; G02F 1/21; G02F 2001/094; G02F 2001/133565; G02F 2001/133607; G02F 2001/133616; G02F 2001/133618; G02F 2001/133626; G02F 2001/213; G02F 2201/50; G02F 2202/28; G02F 2203/01

USPC ......................................................... 359/838
See application file for complete search history.

(56) References Cited

FOREIGN PATENT DOCUMENTS

| | | |
|---|---|---|
| JP | 3419766 B2 | 6/2003 |
| JP | 2004-069926 A | 3/2004 |
| JP | 2004-125886 A | 4/2004 |
| JP | 4211344 B2 | 1/2009 |
| JP | 4348061 B2 | 10/2009 |
| JP | 4927557 B2 | 5/2012 |

SWITCHING MIRROR PANEL AND SWITCHING MIRROR DEVICE

TECHNICAL FIELD

The present invention relates to switching mirror panels and switching mirror devices. In particular, the present invention relates to a switching mirror panel capable of switching between a transparent mode in which images and the like on the back surface side of the mirror panel are visible and a mirror mode in which the mirror panel functions as a mirror. The present invention also relates to a switching mirror device including the switching mirror panel.

BACKGROUND ART

Mirror displays for digital signage or the like applications have been proposed which include a half mirror layer on the viewing surface side of a display device to function as a mirror (for example, see Patent Literatures 1 to 5). Such mirror displays provide images using display light emitted from the display devices and are also used as mirrors in a state of reflecting external light.

CITATION LIST

Patent Literature

Patent Literature 1: JP 3419766 B
Patent Literature 2: JP 4348061 B
Patent Literature 3: JP 4211344 B
Patent Literature 4: JP 2004-125886 A
Patent Literature 5: JP 4927557 B

SUMMARY OF INVENTION

Technical Problem

The half mirror layer is an optical member with a reflective function. For example, reflective polarizing plates (e.g., multilayer reflective polarizing plates) have been studied. A reflective polarizing plate reflects incident polarized light vibrating in the direction parallel to the reflection axis and transmits incident polarized light vibrating in the direction perpendicular to the reflection axis. The reflective polarizing plate therefore can transmit light emitted from a display device as display light to the viewing surface side and reflect external light perpendicular to the polarization direction of the display light to the viewing surface side. A mirror display including a reflective polarizing plate as a half mirror layer switches between the display mode and the mirror mode based on such a principle. In such a mirror display, the reflective polarizing plate always reflects external light. This may result in a bright mirror display even when a display device provides black display, for example. Namely, reflection of external light by the reflective polarizing plate, which is unnecessary in the display mode, may deteriorate display quality (e.g., visibility).

Meanwhile, switching mirror panels have been studied as the half mirror layer which include, in the following order from the back surface side to the front surface side, a reflective polarizing plate, a liquid crystal panel, and an absorptive polarizing plate. Switching mirror panels are capable of switching between the transparent mode of not reflecting external light when a display device provides images and the mirror mode of reflecting external light when the display device provides no images. Conventional switching mirror panels unfortunately fail to display information such as letters and images in the mirror mode. In addition, a switching mirror panel including metal conductive lines in a liquid crystal panel may cause low transmittance in the transparent mode due to interruption of display light emitted from the display device by the metal conductive lines.

Patent Literature 1 discloses a half mirror layer including, in the following order from the back surface side to the front surface side, a reflective polarization selecting member, a varying part for the polarization axis of transmitted light, and an absorptive polarization selecting member. The invention disclosed in Patent Literature 1, however, fails to display information such as letters and images in the mirror mode. Inventions disclosed in Patent Literatures 2 to 5 also fail to display information such as letters and images in the mirror mode.

The present invention was made in view of the situation in the art and aims to provide a switching mirror panel with high transmittance capable of displaying information such as letters and images in the mirror mode, and a switching mirror device including the switching mirror panel.

Solution to Problem

The present inventors variously studied switching mirror panels with high transmittance capable of displaying information such as letters and images in the mirror mode and focused on the configuration in which a liquid crystal panel in a switching mirror panel includes an array substrate with divided pixel regions. They thereby found a configuration in which each of the pixel regions includes a pixel electrode, a transparent insulating film, and transparent conductive lines superimposed on the pixel electrode in the stated order and the pixel electrode is electrically connected to at least one of the transparent conductive lines through an aperture formed in the transparent insulating film. The inventors thus arrived at a solution to the above problem, completing the present invention.

Specifically, an aspect of the present invention may be a switching mirror panel including, in the following order from the back surface side to the front surface side: a reflective polarizing plate; a liquid crystal panel including a pair of substrates facing each other and a liquid crystal layer disposed between the substrates; and an absorptive polarizing plate, at least one of the substrates including divided pixel regions, the pixel regions each including, in the following order from the liquid crystal layer side, a pixel electrode, a transparent insulating film, and transparent conductive lines superimposed on the pixel electrode, the pixel electrode being electrically connected to at least one of the transparent conductive lines through an aperture formed in the transparent insulating film, the switching mirror panel being configured to switch between a transparent mode of transmitting light incident on the reflective polarizing plate from the back surface side through the absorptive polarizing plate and a mirror mode of reflecting light incident on the absorptive polarizing plate from the front surface side by the reflective polarizing plate by applying voltage to the pixel electrode to control the alignment of liquid crystal molecules in the liquid crystal layer.

Another aspect of the present invention may be a switching mirror device including, in the following order from the back surface side to the front surface side, a display device including a polarizing plate and the switching mirror panel.

Still another aspect of the present invention may be a switching mirror device including, in the following order from the back surface side to the front surface side, a light absorber and the switching mirror panel.

Still another aspect of the present invention may be a switching mirror device including, in the following order from the back surface side to the front surface side, a display device, a light absorber, and the switching mirror panel, the display device including a display surface on the opposite side of the light absorber.

Advantageous Effects of Invention

The present invention provides a switching mirror panel with high transmittance capable of displaying information such as letters and images in the mirror mode, and a switching mirror device including the switching mirror panel.

DESCRIPTION OF EMBODIMENTS

The present invention is described below in more detail based on embodiments with reference to the drawings. The embodiments, however, are not intended to limit the scope of the present invention. The configurations employed in the embodiments may appropriately be combined or modified within the spirit of the present invention.

Embodiment 1

Figure 1:
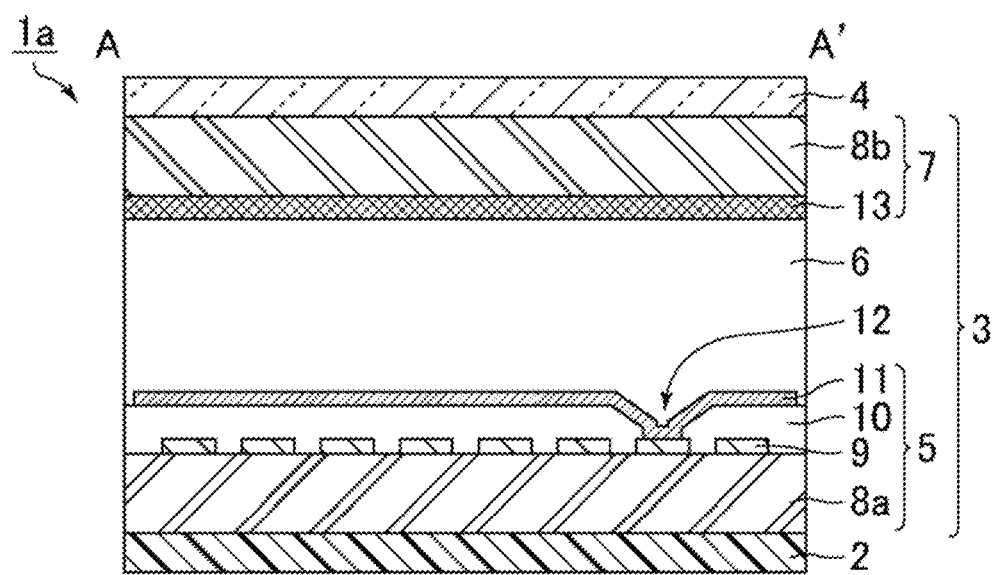
FIG. 1 is a schematic cross-sectional view of a switching mirror panel of Embodiment 1.

FIG. 1 is a schematic cross-sectional view of a switching mirror panel of Embodiment 1. As shown in FIG. 1, a switching mirror panel 1a includes, in the following order from the back surface side to the front surface side, a reflective polarizing plate 2, a liquid crystal panel 3, and an absorptive polarizing plate 4. The reflective polarizing plate 2 may be bonded to the back surface side of the liquid crystal panel 3 via a pressure-sensitive adhesive or the like. The absorptive polarizing plate 4 may be bonded to the front surface side of the liquid crystal panel 3 via a pressure-sensitive adhesive or the like. The term "back surface side" herein indicates the lower side (the reflective polarizing plate 2 side) of the switching mirror panel 1a in FIG. 1, for example. The term "front surface side" herein indicates the upper side (the absorptive polarizing plate 4 side) of the switching mirror panel 1a in FIG. 1, for example. In the present embodiment, the switching mirror panel 1a is viewed from the front surface side (the absorptive polarizing plate 4 side).

The relationship between the transmission axis of the reflective polarizing plate 2 and the transmission axis of the absorptive polarizing plate 4 can appropriately be designed to suit the liquid crystal alignment mode of the liquid crystal panel 3. In order to improve the transparency (visibility of background) of the transparent mode and the specularity (the visibility of mirror image) of the mirror mode, the transmission axis of the reflective polarizing plate 2 and the transmission axis of the absorptive polarizing plate 4 are preferably parallel to or perpendicular to each other. The phrase "two transmission axes are parallel to each other" herein means that the two axes make an angle in the range of 0±3°, preferably 0±1°, more preferably 0±0.5°, particularly preferably 0° (perfectly parallel to each other). The phrase "two transmission axes are perpendicular to each other" means that the two axes make an angle in the range of 90±3°, preferably 90±1°, more preferably 90±0.5°, particularly preferably 90° (perfectly perpendicular to each other).

The reflective polarizing plate 2 may be, for example, a multilayer reflective polarizing plate, a nano-wire grid polarizing plate, or a reflective polarizing plate that utilizes selective reflection of cholesteric liquid crystal. Examples of the multilayer reflective polarizing plate include a reflective polarizing plate (trade name: DBEF) available from Sumitomo 3M Ltd. Examples of the reflective polarizing plate that utilizes selective reflection of cholesteric liquid crystal include a reflective polarizing plate (trade name: PCF) available from Nitto Denko Corporation. The reflectance and transmittance of the reflective polarizing plate 2 are not particularly limited, and may be adjusted as desired by stacking two or more reflective polarizing plates on each other with their transmission axes shifted from each other. The term "reflectance" herein indicates the luminous reflectance unless otherwise stated.

The absorptive polarizing plate 4 may be, for example, a plate obtained by adsorption alignment of a dichroic anisotropic material, such as an iodine complex, on a polyvinyl alcohol (PVA) film. The absorptive polarizing plate has a function of absorbing incident polarized light vibrating in the direction parallel to its absorption axis and transmits incident polarized light vibrating in the direction parallel to its transmission axis perpendicular to the absorption axis.

The absorptive polarizing plate 4 preferably has a parallel transmittance of 37% or higher and 50% or lower, more preferably 37% or higher and 43% or lower, still more preferably 37% or higher and 40% or lower, particularly preferably 38% or higher and 39% or lower. When the absorptive polarizing plate 4 has a parallel transmittance of 37% or higher, the switching mirror panel 1a in the transparent mode achieves better transmittance. In order to improve the transmittance of the switching mirror panel 1a in the transparent mode, the absorptive polarizing plate 4 preferably has a high parallel transmittance. However, the absorptive polarizing plate 4 with too high a parallel transmittance exhibits a low degree of polarization. With such an absorptive polarizing plate, the performance of the switching mirror panel 1a (the function of switching between the transparent mode and the mirror mode) may be insufficient.

The liquid crystal panel 3 includes an array substrate 5, a counter substrate 7 facing the array substrate 5, and a liquid crystal layer 6 disposed between the substrates. The array substrate 5 and the counter substrate 7 are bonded together via a sealing material (not illustrated), with the liquid crystal layer 6 interposed between the substrates 5 and 7.

The array substrate 5 includes a transparent substrate 8a, transparent conductive lines 9 disposed on the surface of the transparent substrate 8a on the liquid crystal layer 6 side, a transparent insulating film 10 covering the transparent conductive lines 9, and a pixel electrode 11 disposed on the surface of the transparent insulating film 10 on the liquid crystal layer 6 side. The transparent conductive lines 9 are superimposed on the pixel electrode 11. The pixel electrode 11 is electrically connected to at least one of the transparent conductive lines 9 (only one line in FIG. 1) at a contact part 12 through an aperture formed in the transparent insulating film 10.

The pixel electrode 11 and one of the transparent conductive lines 9 are directly connected in FIG. 1, but they may be connected via a conductive film. Examples of the conductive film include transparent conductive films formed of indium tin oxide (ITO) and metal films formed of aluminum or titanium. Preferably, the pixel electrode 11 and the transparent conductive line(s) 9 are connected directly or via a transparent conductive film from the viewpoint of improving the transmittance of the switching mirror panel 1a. More preferably, the pixel electrode 11 and the transparent conductive line(s) 9 are directly connected from the viewpoint of efficiently producing the switching mirror panel 1a. In contrast, if the pixel electrode 11 and the transparent conductive line(s) 9 are connected via a metal film, light incident on the switching mirror panel 1a may be interrupted by the metal film, resulting in low transmittance of the switching mirror panel 1a. The term "transparent" herein means a state with a light transmittance of 80% or higher.

Examples of the transparent substrate 8a include glass substrates and plastic substrates.

Examples of the material for the transparent conductive lines 9 and the pixel electrode 11 include indium tin oxide (ITO), indium zinc oxide (IZO), and zinc oxide (ZnO).

Examples of the material for the transparent insulating film 10 include organic insulating films and nitride films.

On the array substrate 5, the pixel electrode 11 may be covered with an alignment film that controls the alignment of liquid crystal molecules in the liquid crystal layer 6. The alignment film may be prepared by a conventionally known method.

Figure 2:
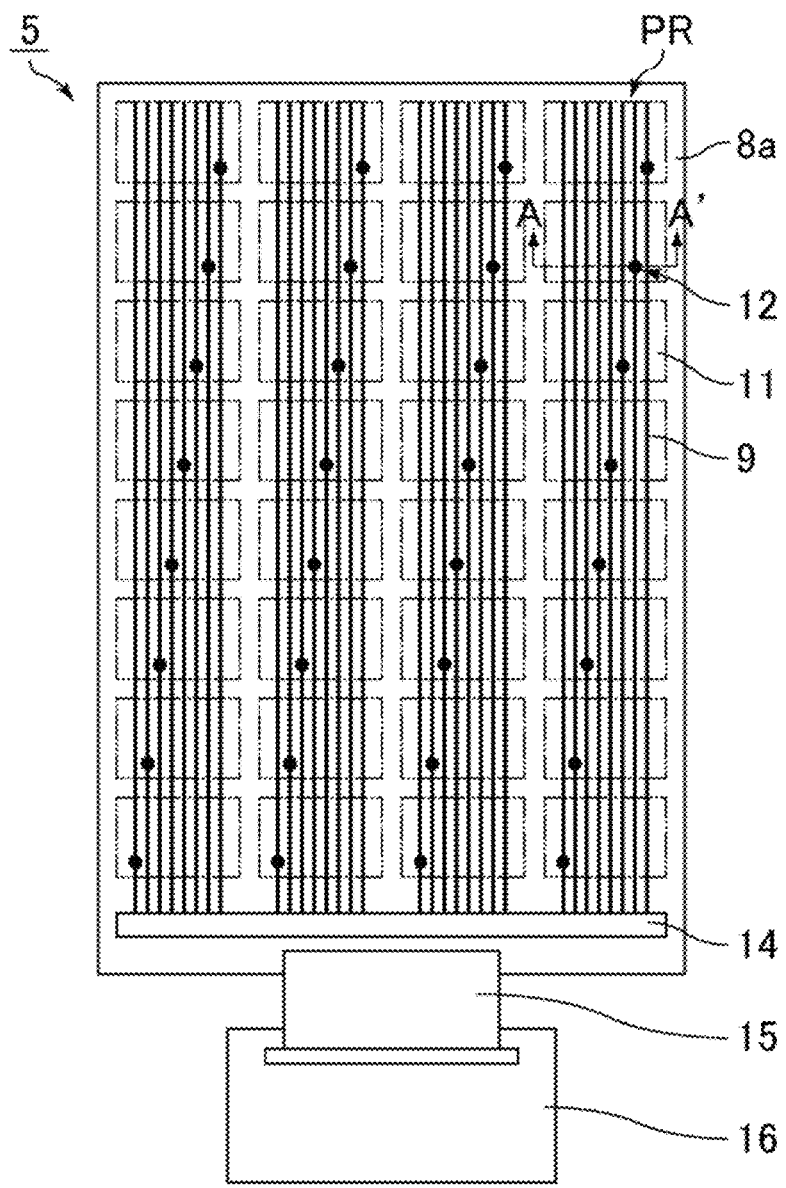
FIG. 2 is a schematic plan view of an array substrate in FIG. 1.

FIG. 2 is a schematic plan view of an array substrate in FIG. 1. FIG. 2 shows an entire view of the array substrate. The cross-sectional view taken along the A-A' line in FIG. 2 corresponds to the cross-sectional view of the array substrate shown in FIG. 1. As shown in FIG. 2, the array substrate 5 includes divided pixel regions PR. The pixel regions PR each include, in the order from the liquid crystal layer 6 side and as shown in FIG. 1, the pixel electrode 11, the transparent insulating film 10, and the transparent conductive lines 9 superimposed on the pixel electrode 11. In the present embodiment, the pixel electrode 11 functions as a segment electrode. In the array substrate 5, the transparent conductive lines 9 are superimposed on the pixel electrode 11, which achieves efficient arrangement of the transparent conductive lines 9. Furthermore, the spaces between the pixel regions PR (pixel electrodes 11) may be reduced to, for example, the order of several micrometers. Such a formation achieves a state where the pixel regions PR (pixel electrodes 11) are recognized as if they constituted one integrated region, improving the specularity in the mirror mode. Additionally, the array substrate 5 includes not metal conductive lines but the transparent conductive lines 9, enhancing the transmittance of the switching mirror panel 1a.

An integrated circuit (IC) 14 is disposed at an end of the array substrate 5 (transparent substrate 8a). The integrated circuit 14 is connected to the transparent conductive lines 9. The integrated circuit 14 can apply (transmit) voltage (signal) to each pixel electrode 11 through the corresponding transparent conductive line 9. The transparent conductive lines 9 extend from the integrated circuit 14 beyond the respective contact parts 12 that connect the transparent conductive lines to the respective pixel electrodes 11. A conductive line (not illustrated) drawn from the integrated circuit 14 is connected to an end of a flexible printed circuit board (FPC) 15. The flexible printed circuit board 15 is connected, at the other end, to a drive circuit 16 for applying voltage to the integrated circuit 14.

Examples of the integrated circuit 14 include chip-on-glass (COG) drivers.

The transparent conductive lines 9 preferably have an equal length as shown in FIG. 2. Furthermore, the pixel regions PR preferably include an equal number of the transparent conductive lines 9 as shown in FIG. 2. This configuration enables the transparent conductive lines 9 to have an equal parasitic capacitance. Thus, when an equal voltage is applied to the transparent conductive lines 9, the pixel electrodes 11 have an equal potential. This achieves a uniform mirror surface without irregular reflection in the mirror mode.

The following is an exemplary production method of the array substrate 5.

(1) Formation of Transparent Conductive Lines

First, a transparent conductive material (e.g., ITO) is applied to the transparent substrate 8a by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form transparent conductive lines 9.

(2) Formation of Transparent Insulating Film

The transparent conductive lines 9 are covered with a transparent insulating material (e.g., organic insulating film). The transparent insulating material applied thereto is sequentially exposed, developed, and baked to form the transparent insulating film 10 in which apertures are formed.

(3) Formation of Pixel Electrodes

A transparent conductive material (e.g., ITO) is applied to the transparent insulating film 10 by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form the pixel electrodes 11. Through the above steps, the array substrate 5 is obtained.

The counter substrate 7 includes a transparent substrate 8b and a common electrode 13 disposed on the transparent substrate 8b on the liquid crystal layer 6 side. The common electrode 13 is a planar (solid) electrode.

The transparent substrate 8b may be a glass substrate or a plastic substrate, for example.

The common electrode 13 may be formed of ITO, IZO, or ZnO, for example.

The following is an exemplary production method of the counter substrate 7. First, a transparent conductive material (e.g., ITO) is applied to the transparent substrate 8b by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form the common electrode 13. Through the above steps, the counter substrate 7 is obtained.

The role of the switching mirror panel 1a is to switch between the transparent mode and the mirror mode. The array substrate 5 and the counter substrate 7 thus have no need for including a color filter layer. Also, there is no need for a backlight to be disposed in the switching mirror panel.

The present embodiment shows a configuration of the liquid crystal panel 3 that includes the array substrate 5 on the back surface side and the counter substrate 7 on the front surface side. The present invention also allows a configuration including the counter substrate 7 on the back surface side and the array substrate 5 on the front surface side (Modified Example 2 of Embodiment 1 described below) and a configuration including the array substrate 5 on the back surface side and the front surface side.

Examples of the liquid crystal alignment mode of the liquid crystal panel 3 include the twisted nematic (TN) mode and the vertical alignment-electrically controlled birefringence (VA-ECB) mode.

The TN mode is a liquid crystal alignment mode using optical rotation (hereinafter, also referred to as optical rotation mode). A TN-mode liquid crystal panel includes a pair of substrates and horizontal alignment films formed on the respective substrates. The liquid crystal layer 6 includes a liquid crystal material with positive anisotropy of dielectric constant.

The horizontal alignment films formed on the substrates in a TN-mode liquid crystal panel have undergone rubbing treatment in the directions perpendicular to each other. Thus, when no voltage is applied, liquid crystal molecules in the liquid crystal layer 6 present horizontal alignment while being gradually twisted from one substrate to the other substrate. As a result, the liquid crystal molecules form a 90° twist between the vicinity of one substrate and the vicinity of the other substrate while keeping the horizontal alignment. In the TN-mode liquid crystal panel with no voltage applied, linearly polarized light emerging from a polarizing plate disposed on the back surface side (hereinafter, also referred to as a back-surface-side polarizing plate) travels along the twisted configuration of liquid crystal molecules, thereby demonstrating 90° rotation of the polarization direction in the end. Here, when the transmission axis of the back-surface-side polarizing plate and the transmission axis of the polarizing plate disposed on the front surface side of the liquid crystal panel (hereinafter, also referred to as a front-surface-side polarizing plate) are placed perpendicular to each other, linearly polarized light emerging from the back-surface-side polarizing plate can pass through the front-surface-side polarizing plate.

When sufficient voltage is applied, the liquid crystal molecules are aligned in the direction perpendicular to each substrate surface by electric fields generated between the substrates and the twisted configuration is depolarized, so that the optical rotation is lost. Here, when the transmission axis of the back-surface-side polarizing plate and the transmission axis of the front-surface-side polarizing plate are placed perpendicular to each other, linearly polarized light emerging from the back-surface-side polarizing plate cannot pass through the front-surface-side polarizing plate. Optical rotation involves small wavelength dispersion (wavelength dependence), and thus the transmitted light in a TN-mode liquid crystal panel is almost achromatic, with or without voltage applied.

The VA-ECB-mode is a liquid crystal alignment mode using the birefringence of liquid crystal molecules (hereinafter, also referred to as a birefringence mode). In the birefringence mode, changing the voltage applied to liquid crystal molecules changes the retardation. In a birefringence mode liquid crystal panel, the polarization state of linearly polarized light emerging from the back-surface-side polarizing plate is altered by the birefringence of the liquid crystal panel, and the linearly polarized light is converted into elliptically polarized light whose ellipticity usually corresponds to the degree of the imparted retardation. The amount of the elliptically polarized light passing through the front-surface-side polarizing plate thus varies according to the ellipticity (i.e., applied voltage).

A VA-ECB-mode liquid crystal panel includes, for example, a pair of substrates and vertical alignment films formed on the respective substrates. The liquid crystal layer includes liquid crystal material with negative anisotropy of dielectric constant.

In a VA-ECB-mode liquid crystal panel with no voltage applied, liquid crystal molecules are vertically aligned to each substrate surface, causing zero retardation. In the VA-ECB-mode liquid crystal panel with no voltage applied, when the transmission axis of the back-surface-side polarizing plate and the transmission axis of the front-surface-side polarizing plate are placed parallel to each other, linearly polarized light vibrating in the direction parallel to the both transmission axes passes through the polarizing plates while holding its polarization state. Thus, the transmitted light is achromatic in the VA-ECB-mode liquid crystal panel with no voltage applied.

Meanwhile, application of voltage gradually tilts the liquid crystal molecules in the direction parallel to each substrate surface, thereby gradually increasing the retardation. As a result, the transmittance of the liquid crystal panel gradually decreases. For example, the transmittance of light having a wavelength of 550 nm becomes minimum when the retardation is 275 nm. The transmittance of light here is proportional to the formula $[\cos(\pi \times R/\lambda)]^2$ wherein R is the retardation of a medium in a configuration including two polarizing plates whose transmission axes are parallel to each other and the medium disposed between the plates, and λ is the wavelength of light incident on the configuration. For example, when the retardation R is half the wavelength λ, the minimum transmittance is obtained. It should be noted that light having a wavelength of 550 nm is light having a wavelength at which the human sensitivity, a luminosity factor, is highest.

The birefringence effects described above, i.e., the effects such as the effect of altering the polarization state of the incident polarized light and the effect of changing the transmittance thereof involve large wavelength dispersion. In a birefringence mode liquid crystal panel, the transmitted light therefore generally cannot be achromatic except for the state of zero retardation. In other words, the birefringence mode liquid crystal panel is capable of switching, in transmission of incident polarized light, between a non-coloring mode of not altering the polarization state of the polarized light (zero retardation state) and a coloring mode of altering the polarization state of the polarized light (non-zero retardation state). The non-coloring mode corresponds to, for example, the state with no voltage applied (the state where sufficient voltage is not applied so as to prevent generation of birefringence) in a VA-ECB-mode liquid crystal panel. The coloring mode corresponds to, for example, the state with voltage applied (the state where sufficient voltage is applied so as to cause birefringence) in a VA-ECB-mode liquid crystal panel.

The switching mirror panel 1a is capable of switching between the transparent mode and the mirror mode by the following principle. In other words, the switching mirror panel 1a can be used as a see-through display. Here, the transparent mode is a state in which voltage applied to the pixel electrode 11 controls the alignment of liquid crystal molecules in the liquid crystal layer 6 so that light incident on the reflective polarizing plate 2 from the back surface side passes through the absorptive polarizing plate 4. The mirror mode is a state in which voltage applied to the pixel electrode 11 controls the alignment of liquid crystal molecules in the liquid crystal layer 6 so that light incident on the absorptive polarizing plate 4 from the front surface side is reflected by the reflective polarizing plate 2. Description of the following specification examples is given below.
(Specification Example 1-1) The case where the liquid crystal panel 3 is a TN-mode liquid crystal panel
(Specification Example 1-2) The case where the liquid crystal panel 3 is a VA-ECB-mode liquid crystal panel Specification Example 1-1

The following is the description of the case where, in the switching mirror panel 1a, the transmission axis of the reflective polarizing plate 2 and the transmission axis of the absorptive polarizing plate 4 are perpendicular to each other.
(Transparent Mode)

The transparent mode is achieved when no voltage is applied (the state where sufficient voltage is not applied to cause optical rotation) in the liquid crystal panel 3. This will be specifically described below.

First, light incident on the reflective polarizing plate 2 from the back surface side that vibrates in the direction parallel to the transmission axis of the reflective polarizing plate 2 passes through the reflective polarizing plate 2 to be converted into linearly polarized light. The linearly polarized light emerging from the reflective polarizing plate 2 travels along the twisted liquid crystal molecules as it passes through the liquid crystal panel 3 (with no voltage applied), thereby demonstrating 90° rotation of the polarization direction. The light is thus converted into linearly polarized light that vibrates in the direction perpendicular to the transmission axis of the reflective polarizing plate 2. The linearly polarized light emerging from the liquid crystal panel 3 passes through the absorptive polarizing plate 4 whose transmission axis is perpendicular to the transmission axis of the reflective polarizing plate 2.

Light incident on the reflective polarizing plate 2 from the back surface side that vibrates in the direction perpendicular to the transmission axis (parallel to the reflection axis) of the reflective polarizing plate 2 is reflected by the reflective polarizing plate 2 to the back surface side.

Thereby, the back surface side of the switching mirror panel 1a is visible in the transparent mode. In addition, light incident on the absorptive polarizing plate 4 from the front surface side that vibrates in the direction parallel to the transmission axis of the absorptive polarizing plate 4 passes through the absorptive polarizing plate 4, the liquid crystal panel 3 (with no voltage applied), and the reflective polarizing plate 2. Light incident on the absorptive polarizing plate 4 from the front surface side that vibrates in the direction perpendicular to the transmission axis (in the direction parallel to the absorption axis) of the absorptive polarizing plate 4 is absorbed by the absorptive polarizing plate 4. This achieves no reflection of external light (light incident on the absorptive polarizing plate 4 from the front surface side) by the reflective polarizing plate 2, preventing low visibility of the back surface side of the switching mirror panel 1a.
(Mirror Mode)

The mirror mode is achieved when voltage is applied (when sufficient voltage is applied to eliminate optical rotation) in the liquid crystal panel 3. This will be specifically described below.

First, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 passes through the liquid crystal panel 3 (with voltage applied) while holding its polarization direction. The linearly polarized light emerging from the liquid crystal panel 3 is reflected by the reflective polarizing plate 2 whose reflection axis is parallel to the transmission axis of the absorptive polarizing plate 4. The linearly polarized light reflected by the reflective polarizing plate 2 passes through the liquid crystal panel 3 and then the absorptive polarizing plate 4 to be emitted as reflected light to the front surface side.

Light incident on the absorptive polarizing plate 4 from the front surface side that vibrates in the direction perpendicular to the transmission axis (parallel to the absorption axis) of the absorptive polarizing plate 4 is absorbed by the absorptive polarizing plate 4.

Thereby, a mirror image is visible by reflected light in the mirror mode. In addition, the liquid crystal panel 3 includes segment electrodes. Voltage application to part(s) of the pixels (pixel regions PR) enables display of information such as letters and images by reflected light. Here, the reflected light is colorless (has an achromatic color). In the pixels with no voltage applied, the back surface side of the switching mirror panel 1a is visible.

The following is the description of the case where, in the switching mirror panel 1a, the transmission axis of the reflective polarizing plate 2 and the transmission axis of the absorptive polarizing plate 4 are parallel to each other.

(Transparent Mode)

The transparent mode is achieved when voltage is applied (when sufficient voltage is applied to eliminate optical rotation) in the liquid crystal panel 3. This will be specifically described below.

First, light incident on the reflective polarizing plate 2 from the back surface side that vibrates in the direction parallel to the transmission axis of the reflective polarizing plate 2 passes through the reflective polarizing plate 2 to be converted into linearly polarized light. The linearly polarized light emerging from the reflective polarizing plate 2 passes through the liquid crystal panel 3 (with voltage applied) while holding its polarization direction. The linearly polarized light emerging from the liquid crystal panel 3 passes through the absorptive polarizing plate 4 whose transmission axis is parallel to the transmission axis of the reflective polarizing plate 2.

Light incident on the reflective polarizing plate 2 from the back surface side that vibrates in the direction perpendicular to the transmission axis (parallel to the reflection axis) of the reflective polarizing plate 2 is reflected by the reflective polarizing plate 2 to the back surface side.

Thereby, the back surface side of the switching mirror panel 1*a* is visible in the transparent mode. In addition, light incident on the absorptive polarizing plate 4 from the front surface side that vibrates in the direction parallel to the transmission axis of the absorptive polarizing plate 4 passes through the absorptive polarizing plate 4, the liquid crystal panel 3 (with voltage applied), and the reflective polarizing plate 2. Light incident on the absorptive polarizing plate 4 from the front surface side that vibrates in the direction perpendicular to the transmission axis (in the direction parallel to the absorption axis) of the absorptive polarizing plate 4 is absorbed by the absorptive polarizing plate 4. This achieves no reflection of external light (light incident on the absorptive polarizing plate 4 from the front surface side) by the reflective polarizing plate 2, preventing low visibility of the back surface side of the switching mirror panel 1*a*.

(Mirror Mode)

The mirror mode is achieved when no voltage is applied (when sufficient voltage is not applied so as to cause optical rotation) in the liquid crystal panel 3. This will be specifically described below.

First, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 travels along the twisted liquid crystal molecules as it passes through the liquid crystal panel 3 (with no voltage applied), thereby demonstrating 90° rotation of the polarization direction. The light is thus converted into linearly polarized light that vibrates in the direction perpendicular to the transmission axis of the absorptive polarizing plate 4. The linearly polarized light emerging from the liquid crystal panel 3 is reflected by the reflective polarizing plate 2 whose reflection axis is perpendicular to the transmission axis of the absorptive polarizing plate 4. The linearly polarized light reflected by the reflective polarizing plate 2 passes through the liquid crystal panel 3 and then the absorptive polarizing plate 4 to be emitted as reflected light to the front surface side.

Light incident on the absorptive polarizing plate 4 from the front surface side that vibrates in the direction perpendicular to the transmission axis (parallel to the absorption axis) of the absorptive polarizing plate 4 is absorbed by the absorptive polarizing plate 4.

Thereby, a mirror image is visible by reflected light in the mirror mode. In addition, the liquid crystal panel 3 includes segment electrodes. No voltage application to part(s) of the pixels (pixel regions PR) enables display of information such as letters and images by reflected light. In the pixels with voltage applied, the back surface side of the switching mirror panel 1*a* is visible.

When the liquid crystal panel 3 is an optical rotation mode (e.g., TN mode) liquid crystal panel, the transmission axis of the reflective polarizing plate 2 and the transmission axis of the absorptive polarizing plate 4 are preferably perpendicular to each other in order to improve the transmittance of the switching mirror panel 1*a* in the transparent mode. If the transmission axis of the reflective polarizing plate 2 and the transmission axis of the absorptive polarizing plate 4 are parallel to each other, the transparent mode is achieved when voltage is applied to the liquid crystal panel 3 as stated above, which causes retardation.

Specification Example 1-2

The following is the description of the case where, in the switching mirror panel 1*a*, the transmission axis of the reflective polarizing plate 2 and the transmission axis of the absorptive polarizing plate 4 are parallel to each other.

(Transparent Mode)

The transparent mode is achieved when no voltage is applied (when sufficient voltage is not applied so as to prevent birefringence) in the liquid crystal panel 3. This will be specifically described below.

First, light incident on the reflective polarizing plate 2 from the back surface side that vibrates in the direction parallel to the transmission axis of the reflective polarizing plate 2 passes through the reflective polarizing plate 2 to be converted into linearly polarized light. Here, the liquid crystal panel 3 has zero retardation. The linearly polarized light emerging from the reflective polarizing plate 2 thus passes through the liquid crystal panel 3 (with no voltage applied) while holding its polarization state (non-coloring mode). The linearly polarized light emerging from the liquid crystal panel 3 passes through the absorptive polarizing plate 4 whose transmission axis is parallel to the transmission axis of the reflective polarizing plate 2.

Light incident on the reflective polarizing plate 2 from the back surface side that vibrates in the direction perpendicular to the transmission axis (parallel to the reflection axis) of the reflective polarizing plate 2 is reflected by the reflective polarizing plate 2 to the back surface side.

Thereby, the back surface side of the switching mirror panel 1*a* is visible in the transparent mode. In addition, light incident on the absorptive polarizing plate 4 from the front surface side that vibrates in the direction parallel to the transmission axis of the absorptive polarizing plate 4 passes through the absorptive polarizing plate 4, the liquid crystal panel 3 (with no voltage applied), and the reflective polarizing plate 2. Light incident on the absorptive polarizing plate 4 from the front surface side that vibrates in the direction perpendicular to the transmission axis (in the direction parallel to the absorption axis) of the absorptive polarizing plate 4 is absorbed by the absorptive polarizing plate 4. This achieves no reflection of external light (light incident on the absorptive polarizing plate 4 from the front surface side) by the reflective polarizing plate 2, preventing low visibility of the back surface side of the switching mirror panel 1a.

(Mirror Mode)

The mirror mode is achieved when voltage is applied (when sufficient voltage is applied so as to cause birefringence) in the liquid crystal panel 3. This will be specifically described below.

First, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The polarization state of linearly polarized light emerging from the absorptive polarizing plate 4 is altered by the birefringence effects of the liquid crystal panel 3 (coloring mode) as it passes through the liquid crystal panel 3 (with voltage applied), and the linearly polarized light is converted into elliptically polarized light. The elliptically polarized light emerging from the liquid crystal panel 3 that vibrates in the direction parallel to the transmission axis of the reflective polarizing plate 2 passes through the reflective polarizing plate 2. In contrast, the elliptically polarized light emerging from the liquid crystal panel 3 that vibrates in the direction perpendicular to the transmission axis (parallel to the reflection axis) of the reflective polarizing plate 2 is reflected by the reflective polarizing plate 2 as linearly polarized light. The polarization state of the linearly polarized light reflected by the reflective polarizing plate 2 is altered by the birefringence effects of the liquid crystal panel 3 as it passes through the liquid crystal panel 3, and the linearly polarized light is converted into elliptically polarized light. The elliptically polarized light emerging from the liquid crystal panel 3 that vibrates in the direction parallel to the transmission axis of the absorptive polarizing plate 4 passes through the absorptive polarizing plate 4 to be emitted as reflected light to the front surface side. The elliptically polarized light emerging from the liquid crystal panel 3 that vibrates in the direction perpendicular to the transmission axis (parallel to the absorption axis) of the absorptive polarizing plate 4 is absorbed by the absorptive polarizing plate 4.

Light incident on the absorptive polarizing plate 4 from the front surface side that vibrates in the direction perpendicular to the transmission axis (parallel to the absorption axis) of the absorptive polarizing plate 4 is absorbed by the absorptive polarizing plate 4.

Thereby, a mirror image is visible by reflected light in the mirror mode. In addition, the liquid crystal panel 3 includes segment electrodes. Voltage application to part(s) of the pixels (pixel regions PR) thus enables display of information such as letters and images by reflected light. Here, variation in polarization state caused by the birefringence and variations in transmittance and reflectance that accompany the polarization state variation involve large wavelength dispersion. The intensity of reflected light thus varies according to the wavelength. Namely, the reflected light is colored in the mirror mode. In the pixels with no voltage applied, the back surface side of the switching mirror panel 1a is visible.

In a liquid crystal panel 3 of birefringence mode (e.g., VA-ECB-mode), the color of reflected light can be adjusted by the effective retardation introduced by the liquid crystal panel 3. The "effective retardation" (also referred to simply as retardation) herein refers to the retardation observed from the normal direction in the state where a certain level of voltage is applied to a birefringence mode liquid crystal panel. For example, in a VA-ECB-mode liquid crystal panel, the effective retardation is zero because the liquid crystal molecules are aligned perpendicularly to each substrate surface when no voltage is applied. Here, application of voltage gradually tilts the liquid crystal molecules in the direction parallel to each substrate surface, thereby gradually increasing the effective retardation. When all the liquid crystal molecules are uniformly tilted in the direction parallel to each substrate surface, the effective retardation becomes maximum. Here, the maximum effective retardation in principle is represented by $\Delta nd$ (hereinafter, also referred to as liquid crystal retardation) where $\Delta n$ is the refractive index anisotropy of the liquid crystal (liquid crystal layer 6) constituting the liquid crystal panel 3 and d is the thickness of the liquid crystal layer.

With the actual configuration and materials of the liquid crystal panel 3, it is substantially difficult to align all the liquid crystal molecules uniformly. Typically, the liquid crystal molecules are not uniformly distributed in at least one of the thickness direction and the horizontal direction of the liquid crystal layer 6. For example, liquid crystal molecules in the vicinity of each substrate surface are less likely to move even when voltage is applied due to the alignment regulating force of the alignment films. In contrast, liquid crystal molecules in the vicinity of the center portion in the thickness direction are more likely to move when voltage is applied. Liquid crystal molecules are therefore not uniformly aligned in the thickness direction. For these reasons, the maximum effective retardation is actually not completely the same as, but is slightly lower than, the liquid crystal retardation ($\Delta nd$). It is still true that a larger liquid crystal retardation leads to a larger maximum effective retardation and thus widens the range of the retardation that can be achieved by the birefringence mode liquid crystal panel 3. Hence, setting the value of the liquid crystal retardation of the birefringence mode liquid crystal panel 3 is important for color adjustment of reflected light. A larger liquid crystal retardation is more preferred.

As described above, the transmittance of the birefringence mode liquid crystal panel 3 in principle is minimum when the effective retardation is half the wavelength of incident light. That is, increasing the effective retardation to a value greater than the half of the wavelength of incident light corresponds to sufficiently shifting the alignment state of the liquid crystal molecules. For example, in a VA-ECB-mode liquid crystal panel, it corresponds to shifting the alignment of the liquid crystal molecules perpendicular to each substrate surface to the alignment parallel to each substrate surface. This means that, in the coloring mode, the color of reflected light can be adjusted when the birefringence mode liquid crystal panel 3 introduces a retardation (effective value) greater than the half of the wavelength of incident light. Such a retardation of the birefringence mode liquid crystal panel 3 is usually designed for light having a wavelength of 550 nm at which the human sensitivity, a luminosity factor, is highest. Hence, in the coloring mode, the birefringence mode liquid crystal panel 3 preferably changes the retardation to a value greater than 275 nm when measured with light having a wavelength of 550 nm. This enables adjustment of the color of reflected light. The expression "shifting the retardation to a value greater than 275 nm" herein means increasing the retardation to the maximum value X and the retardation X is a value greater than 275 nm.

The following is the description of the case where, in the switching mirror panel 1a, the transmission axis of the reflective polarizing plate 2 and the transmission axis of the absorptive polarizing plate 4 are perpendicular to each other.

(Transparent Mode)

The transparent mode is achieved when voltage is applied (when sufficient voltage is applied so as to cause birefringence) in the liquid crystal panel 3. This will be specifically described below.

First, light incident on the reflective polarizing plate 2 from the back surface side that vibrates in the direction parallel to the transmission axis of the reflective polarizing plate 2 passes through the reflective polarizing plate 2 to be converted into linearly polarized light. The polarization state of the linearly polarized light emerging from the reflective polarizing plate 2 is altered by the birefringence effects of the liquid crystal panel 3 (coloring mode) as it passes through the liquid crystal panel 3 (with voltage applied), and the linearly polarized light is converted into elliptically polarized light. The elliptically polarized light emerging from the liquid crystal panel 3 that vibrates in the direction parallel to the transmission axis of the absorptive polarizing plate 4 passes through the absorptive polarizing plate 4. In contrast, the elliptically polarized light emerging from the liquid crystal panel 3 that vibrates in the direction perpendicular to the transmission axis (parallel to the absorption axis) of the absorptive polarizing plate 4 is absorbed by the absorptive polarizing plate 4.

Light incident on the reflective polarizing plate 2 from the back surface side that vibrates in the direction perpendicular to the transmission axis (parallel to the reflection axis) of the reflective polarizing plate 2 is reflected by the reflective polarizing plate 2 to the back surface side.

Thereby, the back surface side of the switching mirror panel 1a is visible in the transparent mode. Here, variation in polarization state caused by the birefringence and variation in transmittance that accompanies the polarization state variation involve large wavelength dispersion. Transmitted light passing through the switching mirror panel 1a from the back surface side thus changes its intensity according to the wavelength. Namely, transmitted light is colored in the transparent mode.

(Mirror Mode)

The mirror mode is achieved when no voltage is applied (when sufficient voltage is not applied so as to prevent birefringence) in the liquid crystal panel 3. This will be specifically described below.

First, light incident on the absorptive polarizing plate 4 from the front surface side that vibrates in the direction parallel to the transmission axis of the absorptive polarizing plate 4 passes through the absorptive polarizing plate 4 to be converted into linearly polarized light. Here, the liquid crystal panel 3 has zero retardation. The linearly polarized light emerging from the absorptive polarizing plate 4 thus passes through the liquid crystal panel 3 (with no voltage applied) while holding its polarization state (non-coloring mode). The linearly polarized light emerging from the liquid crystal panel 3 is reflected by the reflective polarizing plate 2 whose reflection axis is parallel to the transmission axis of the absorptive polarizing plate 4. The linearly polarized light reflected by the reflective polarizing plate 2 passes through the liquid crystal panel 3 and then the absorptive polarizing plate 4 to be emitted as reflected light to the front surface side.

Light incident on the absorptive polarizing plate 4 from the front surface side that vibrates in the direction perpendicular to the transmission axis (parallel to the absorption axis) of the absorptive polarizing plate 4 is absorbed by the absorptive polarizing plate 4.

Thereby, a mirror image is visible by reflected light in the mirror mode. In addition, the liquid crystal panel 3 includes segment electrodes. No voltage application to part(s) of the pixels (pixel regions PR) enables display of information such as letters and images by reflected light. Here, reflected light is colorless (achromatic). In the pixels with voltage applied, the back surface side of the switching mirror panel 1a is visible.

When the liquid crystal panel 3 is a birefringence mode (e.g., VA-ECB-mode) liquid crystal panel, the transmission axis of the reflective polarizing plate 2 and the transmission axis of the absorptive polarizing plate 4 are preferably parallel to each other from the viewpoint of improving the transmittance of the switching mirror panel 1a in the transparent mode. If the transmission axis of the reflective polarizing plate 2 and the transmission axis of the absorptive polarizing plate 4 are perpendicular to each other, the transparent mode is achieved when voltage is applied to the liquid crystal panel 3 as stated above, which causes retardation.

Figure 3:
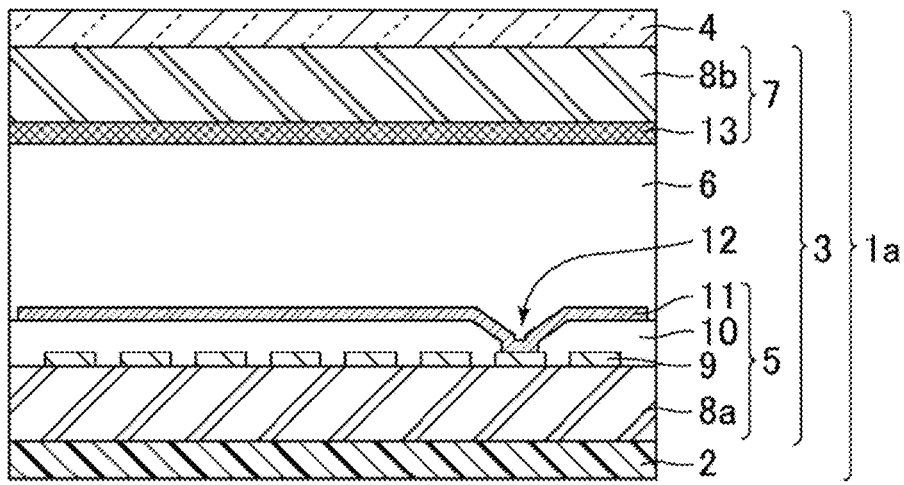
FIG. 3 is a schematic cross-sectional view of a switching mirror device of Embodiment 1.
Figure 3:
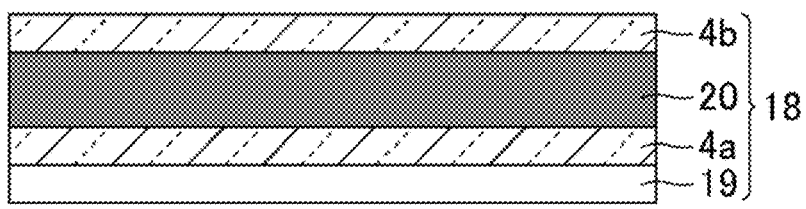

FIG. 3 is a schematic cross-sectional view of a switching mirror device of Embodiment 1. As shown in FIG. 3, a switching mirror device 17a includes, in the following order from the back surface side to the front surface side, a liquid crystal display device 18 and the switching mirror panel 1a. The present embodiment gives a configuration in which the switching mirror panel 1a and the liquid crystal display device 18 are disposed with a distance (with an air layer in between). These members may be bonded together with a pressure-sensitive adhesive or the like (such a configuration will be described in Modified Example 1 of Embodiment 1).

The liquid crystal display device 18 includes, in the following order from the back surface side to the front surface side, a backlight 19, an absorptive polarizing plate 4a, a liquid crystal panel 20 for display, and an absorptive polarizing plate 4b. The absorptive polarizing plate 4a may be bonded to the back surface side of the liquid crystal panel 20 for display with a pressure-sensitive adhesive or the like. The absorptive polarizing plate 4b may be bonded to the front surface side of the liquid crystal panel 20 for display with a pressure-sensitive adhesive or the like. In the present embodiment, the liquid crystal display device 18 is viewed from the front surface side (the absorptive polarizing plate 4b side). Namely, the liquid crystal display device 18 has a display surface on the switching mirror panel 1a side.

The relationship between the transmission axis of the absorptive polarizing plate 4a and the transmission axis of the absorptive polarizing plate 4b can appropriately be designed to suit the liquid crystal alignment mode of the liquid crystal panel 20 for display. In order to enhance the visibility of images of the liquid crystal panel 20 for display in the transparent mode and the visibility of mirror image in the mirror mode, the transmission axis of the reflective polarizing plate 2 and the transmission axis of the absorptive polarizing plate 4b are preferably parallel to each other. The absorptive polarizing plate 4b may be excluded and the functions thereof may alternatively be conducted by the reflective polarizing plate 2. Yet, since the degree of polarization of a reflective polarizing plate is typically lower than that of an absorptive polarizing plate, exclusion of the absorptive polarizing plate 4b causes a decrease in the contrast ratio in the display mode. Conversely, a sufficient degree of polarization of the reflective polarizing plate 2 allows exclusion of the absorptive polarizing plate 4b. In order to exclude the absorptive polarizing plate 4b, the degree of polarization of the reflective polarizing plate 2 is preferably 90% or higher (contrast ratio of 10 or higher), more preferably 99% or higher (contrast ratio of 100 or higher).

The absorptive polarizing plate 4a and the absorptive polarizing plate 4b may each be, for example, a plate obtained by adsorption alignment of a dichroic anisotropic material, such as an iodine complex, on a polyvinyl alcohol film.

The backlight 19 may be of any type such as an edge-lit backlight or a direct-lit backlight. The light source of the backlight 19 may be of any type such as light emitting diodes (LEDs) or cold cathode fluorescent lamps (CCFLs).

The liquid crystal panel 20 for display has a configuration including a liquid crystal layer held between paired substrates (not illustrated). The paired substrates constituting the liquid crystal panel 20 for display are attached to each other with a sealant to hold the liquid crystal layer in between.

The paired substrates constituting the liquid crystal panel 20 for display may be of any type such as a thin-film transistor array substrate and a color filter substrate in combination.

The thin-film transistor array substrate may have a configuration including, for example, various conductive lines such as thin-film transistor elements on a transparent substrate such as a glass substrate or a plastic substrate. The thin-film transistor elements each include a semiconductor layer which may contain, without limitation, amorphous silicon, low-temperature polysilicon, or oxide semiconductor. Examples of the oxide semiconductor include compounds containing indium, gallium, zinc, and oxygen and compounds containing indium, zinc, and oxygen. In the case of using as the oxide semiconductor a compound containing indium, gallium, zinc, and oxygen which has a low off-leakage current, application of voltage to the oxide semiconductor enables paused drive in which the voltage is held until the next data signal (voltage) is input (applied). A compound containing indium, gallium, zinc, and oxygen is therefore preferred as the oxide semiconductor in terms of low power consumption.

The color filter substrate may have a configuration including, for example, a color filter layer disposed on a transparent substrate such as a glass substrate or a plastic substrate. The combination of colors for the color filter layer may be, but is not particularly limited to, a combination of red, green, and blue, or a combination of red, green, blue, and yellow.

The liquid crystal alignment mode of the liquid crystal panel 20 for display may be, but is not particularly limited to, a multi-domain vertical alignment (MVA) mode, a fringe field switching (FFS) mode, a vertical alignment (VA) mode, an in-plane switching (IPS) mode, an optically compensated birefringence (OCB) mode, and a TN mode.

In a MVA-mode liquid crystal panel with no voltage applied, liquid crystal molecules having a negative anisotropy of dielectric constant are aligned perpendicularly to each substrate surface. The MVA-mode liquid crystal panel includes structures such as ribs or slits disposed on at least one of the substrates. These structures control liquid crystal molecules to tilt in directions when voltage is applied to achieve a wide viewing angle. The MVA mode encompasses an ultra-violet induced multi-domain vertical alignment ($UV^2A$) mode that uses alignment division of a photo-alignment film.

In a FFS-mode liquid crystal panel, alignment films disposed on paired substrates are subjected to rubbing treatment in the direction anti-parallel to each other. Thus, when no voltage is applied, liquid crystal molecules are aligned parallelly to each substrate surface. Here, one of the paired substrates constituting the FFS-mode liquid crystal panel includes, in the following order from the liquid crystal layer side, an upper layer electrode (comb-teeth electrode) with slits, a transparent insulating film (e.g., nitride film), and a planar (solid) lower layer electrode. In this configuration, voltage application between the upper and lower layer electrodes generates fringe electric fields. The FFS-mode liquid crystal panel thus enables the fringe electric fields to vary the alignment direction of liquid crystal molecules, thereby controlling the amount of transmitted light.

The present embodiment gives a configuration in which the liquid crystal display device 18 is disposed on the back surface side of the switching mirror panel 1a. The liquid crystal display device 18 may be replaced by a different display device including a polarizing plate. Examples of the different display device include display devices that emit polarized light, such as an organic electroluminescence display device including an absorptive circularly polarizing plate for antireflection and a micro electro mechanical system (MEMS) display to which a polarizing plate is attached.

The switching mirror device 17a can be operated by the following principle. Description of the following examples is given below.

(Specification Example 2-1) The case where the liquid crystal panel 3 is a TN-mode liquid crystal panel and the liquid crystal panel 20 for display is a MVA- or FFS-mode liquid crystal panel (Specification Example 2-2) The case where the liquid crystal panel 3 is a VA-ECB-mode liquid crystal panel and the liquid crystal panel 20 for display is a MVA- or FFS-mode liquid crystal panel Specification Example 2-1

The following is the description of the case where, in the switching mirror panel 1a, the transmission axis of the reflective polarizing plate 2 and the transmission axis of the absorptive polarizing plate 4 are perpendicular to each other. In the liquid crystal display device 18, the transmission axis of the absorptive polarizing plate 4a and the transmission axis of the absorptive polarizing plate 4b are perpendicular to each other. The transmission axis of the reflective polarizing plate 2 and the transmission axis of the absorptive polarizing plate 4b are parallel to each other.

(Transparent Mode)

The transparent mode is achieved when no voltage is applied (when sufficient voltage is not applied to cause optical rotation) in the liquid crystal panel 3. This will be specifically described below.

When the liquid crystal panel 20 for display provides an image (display mode), linearly polarized light emitted from the liquid crystal display device 18 (linearly polarized light emerging from the absorptive polarizing plate 4b) passes through the reflective polarizing plate 2 whose transmission axis is parallel to the transmission axis of the absorptive polarizing plate 4b. The linearly polarized light emerging from the reflective polarizing plate 2 travels along the twisted liquid crystal molecules as it passes through the liquid crystal panel 3 (with no voltage applied), thereby demonstrating 90° rotation of the polarization direction. The light is thus converted into linearly polarized light that vibrates in the direction perpendicular to the transmission axis of the reflective polarizing plate 2. The linearly polarized light emerging from the liquid crystal panel 3 passes through the absorptive polarizing plate 4 whose transmission axis is perpendicular to the transmission axis of the reflective polarizing plate 2. In other words, despite the existence of the switching mirror panel 1a, the image provided by the liquid crystal panel 20 for display is visible as in the case without the switching mirror panel 1a.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 travels along the twisted liquid crystal molecules as it passes through the liquid crystal panel 3, thereby demonstrating 90° rotation of the polarization direction. The light is thus converted into linearly polarized light that vibrates in the direction perpendicular to the transmission axis of the absorptive polarizing plate 4. The linearly polarized light emerging from the liquid crystal panel 3 passes through the reflective polarizing plate 2 whose transmission axis is perpendicular to the transmission axis of the absorptive polarizing plate 4. The linearly polarized light emerging from the reflective polarizing plate 2 passes through the absorptive polarizing plate 4b and is absorbed by the absorptive polarizing plate 4a or members of the liquid crystal panel 20 for display, such as a color filter layer and black matrix. There is thus little light that travels back as reflected light to the front surface side of the switching mirror device 17a.

Thereby, the image provided by the liquid crystal panel 20 for display is visible in the transparent mode. In addition, there is no reflection of external light (light incident on the absorptive polarizing plate 4 from the front surface side) by the reflective polarizing plate 2, thereby preventing low visibility of the image provided by the liquid crystal panel 20 for display. In the transparent mode, the liquid crystal panel 20 for display may be in a non-display state.

(Mirror Mode)

The mirror mode is achieved when voltage is applied (when sufficient voltage is applied to eliminate optical rotation) in the liquid crystal panel 3. This will be specifically described below.

The liquid crystal panel 20 for display is in a non-display state. Here, the liquid crystal panel 20 for display preferably provides no display entirely or partially. Providing no display may be achieved by emitting no display light from the liquid crystal display device 18 by providing black display or, turning out or toning down the backlight 19.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 passes through the liquid crystal panel 3 (with voltage applied) while holding its polarization direction. The linearly polarized light emerging from the liquid crystal panel 3 is reflected by the reflective polarizing plate 2 whose reflection axis is parallel to the transmission axis of the absorptive polarizing plate 4. The linearly polarized light reflected by the reflective polarizing plate 2 passes through the liquid crystal panel 3 and then the absorptive polarizing plate 4 to be emitted as reflected light to the front surface side.

Thereby, a mirror image is visible by reflected light in the mirror mode. In addition, the liquid crystal panel 3 includes segment electrodes. Voltage application to part(s) of the pixels (pixel regions PR) enables display of information such as letters and images by reflected light. Here, reflected light is colorless (has an achromatic color). In the pixels with no voltage applied, an image provided by the liquid crystal panel 20 for display is visible.

The following is the description of the case where, in the switching mirror panel 1a, the transmission axis of the reflective polarizing plate 2 and the transmission axis of the absorptive polarizing plate 4 are parallel to each other. In the liquid crystal display device 18, the transmission axis of the absorptive polarizing plate 4a and the transmission axis of the absorptive polarizing plate 4b are perpendicular to each other. The transmission axis of the reflective polarizing plate 2 and the transmission axis of the absorptive polarizing plate 4b are parallel to each other.

(Transparent Mode)

The transparent mode is achieved when voltage is applied (when sufficient voltage is applied to eliminate optical rotation) in the liquid crystal panel 3. This will be specifically described below.

When the liquid crystal panel 20 for display provides an image (display mode), linearly polarized light emitted from the liquid crystal display device 18 (linearly polarized light emerging from the absorptive polarizing plate 4b) passes through the reflective polarizing plate 2 whose transmission axis is parallel to the transmission axis of the absorptive polarizing plate 4b. The linearly polarized light emerging from the reflective polarizing plate 2 passes through the liquid crystal panel 3 (with voltage applied) while holding its polarization direction. The linearly polarized light emerging from the liquid crystal panel 3 passes through the absorptive polarizing plate 4 whose transmission axis is parallel to the transmission axis of the reflective polarizing plate 2. In other words, despite the existence of the switching mirror panel 1a, the image provided by the liquid crystal panel 20 for display is visible as in the case without the switching mirror panel 1a.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 passes through the liquid crystal panel 3 (with voltage applied) while holding its polarization direction. The linearly polarized light emerging from the liquid crystal panel 3 passes through the reflective polarizing plate 2 whose transmission axis is parallel to the transmission axis of the absorptive polarizing plate 4. The linearly polarized light emerging from the reflective polarizing plate 2 passes through the absorptive polarizing plate 4b and is absorbed by the absorptive polarizing plate 4a or members of the liquid crystal panel 20 for display, such as a color filter layer and black matrix. There is thus little light that travels back as reflected light to the front surface side of the switching mirror device 17a.

Thereby, the image provided by the liquid crystal panel 20 for display is visible in the transparent mode. In addition, there is no reflection of external light (light incident on the absorptive polarizing plate 4 from the front surface side) by the reflective polarizing plate 2, thereby avoiding decrease in visibility of the image provided by the liquid crystal panel 20 for display. In the transparent mode, the liquid crystal panel 20 for display may be in a non-display state.

(Mirror Mode)

The mirror mode is achieved when no voltage is applied (when sufficient voltage is not applied so as to cause optical rotation) in the liquid crystal panel 3. This will be specifically described below.

The liquid crystal panel 20 for display is in a non-display state. Here, the liquid crystal panel 20 for display preferably provides no display entirely or partially. Providing no display may be achieved by emitting no display light from the liquid crystal display device 18 by providing black display or, turning out or toning down the backlight 19.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 travels along the twisted liquid crystal molecules as it passes through the liquid crystal panel 3 (with no voltage applied), thereby demonstrating 90° rotation of the polarization direction. The light is thus converted into linearly polarized light that vibrates in the direction perpendicular to the transmission axis of the absorptive polarizing plate 4. The linearly polarized light emerging from the liquid crystal panel 3 is reflected by the reflective polarizing plate 2 whose reflection axis is perpendicular to the transmission axis of the absorptive polarizing plate 4. The linearly polarized light reflected by the reflective polarizing plate 2 passes through the liquid crystal panel 3 and then the absorptive polarizing plate 4 to be emitted as reflected light to the front surface side.

Thereby, a mirror image is visible by reflected light in the mirror mode. In addition, the liquid crystal panel 3 includes segment electrodes. No voltage application to part(s) of the pixels (pixel regions PR) enables display of information such as letters and images by reflected light. In the pixels with voltage applied, an image provided by the liquid crystal panel 20 for display is visible.

Specification Example 2-2

The following is the description of the case where, in the switching mirror panel 1a, the transmission axis of the reflective polarizing plate 2 and the transmission axis of the absorptive polarizing plate 4 are parallel to each other. In the liquid crystal display device 18, the transmission axis of the absorptive polarizing plate 4a and the transmission axis of the absorptive polarizing plate 4b are perpendicular to each other. The transmission axis of the reflective polarizing plate 2 and the transmission axis of the absorptive polarizing plate 4b are parallel to each other.

(Transparent Mode)

The transparent mode is achieved when no voltage is applied (when sufficient voltage is not applied so as to prevent birefringence) in the liquid crystal panel 3. This will be specifically described below.

When the liquid crystal panel 20 for display provides an image (display mode), linearly polarized light emitted from the liquid crystal display device 18 (linearly polarized light emerging from the absorptive polarizing plate 4b) passes through the reflective polarizing plate 2 whose transmission axis is parallel to the transmission axis of the absorptive polarizing plate 4b. Here, the liquid crystal panel 3 has zero retardation. The linearly polarized light emerging from the reflective polarizing plate 2 thus passes through the liquid crystal panel 3 (with no voltage applied) while holding its polarization state (non-coloring mode). The linearly polarized light emerging from the liquid crystal panel 3 passes through the absorptive polarizing plate 4 whose transmission axis is parallel to the transmission axis of the reflective polarizing plate 2. In other words, despite the existence of the switching mirror panel 1a, the image provided by the liquid crystal panel 20 for display is visible as in the case without the switching mirror panel 1a.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The linearly polarized light emerging from the absorptive polarizing plate 4 passes through the liquid crystal panel 3 while holding its polarization state. The linearly polarized light emerging from the liquid crystal panel 3 passes through the reflective polarizing plate 2 whose transmission axis is parallel to the transmission axis of the absorptive polarizing plate 4. The linearly polarized light emerging from the reflective polarizing plate 2 passes through the absorptive polarizing plate 4b and is absorbed by the absorptive polarizing plate 4a or members of the liquid crystal panel 20 for display, such as a color filter layer and black matrix. There is thus little light that travels back as reflected light to the front surface side of the switching mirror device 17a.

Thereby, the image provided by the liquid crystal panel 20 for display is visible in the transparent mode. In addition, there is no reflection of external light (light incident on the absorptive polarizing plate 4 from the front surface side) by the reflective polarizing plate 2, thereby avoiding decrease in visibility of the image provided by the liquid crystal panel 20 for display. In the transparent mode, the liquid crystal panel 20 for display may be in a non-display state.

(Mirror Mode)

The mirror mode is achieved when voltage is applied (when sufficient voltage is applied so as to cause birefringence) in the liquid crystal panel 3. This will be specifically described below.

The liquid crystal panel 20 for display is in a non-display state. Here, the liquid crystal panel 20 for display preferably provides no display entirely or partially. Providing no display may be achieved by emitting no display light from the liquid crystal display device 18 by providing black display or, turning out or toning down the backlight 19.

Meanwhile, light incident on the absorptive polarizing plate 4 from the front surface side that vibrates in the direction parallel to the transmission axis of the absorptive polarizing plate 4 passes through the absorptive polarizing plate 4 to be converted into linearly polarized light. The polarization state of the linearly polarized light emerging from the absorptive polarizing plate 4 is altered (coloring mode) by the birefringence effects of the liquid crystal panel 3 as it passes through the liquid crystal panel 3 (with voltage applied), and the linearly polarized light is converted into elliptically polarized light. The elliptically polarized light emerging from the liquid crystal panel 3 that vibrates in the direction parallel to the transmission axis of the reflective polarizing plate 2 passes through the reflective polarizing plate 2 and is absorbed by the absorptive polarizing plate 4a or members of the liquid crystal panel 20 for display, such as a color filter layer and black matrix. In contrast, the elliptically polarized light emerging from the liquid crystal panel 3 that vibrates in the direction perpendicular to the transmission axis (parallel to the reflection axis) of the reflective polarizing plate 2 is reflected by the reflective polarizing plate 2 as linearly polarized light. The polarization state of the linearly polarized light reflected by the reflective polarizing plate 2 is altered by the birefringence effects of the liquid crystal panel 3 as it passes through the liquid crystal panel 3, and the linearly polarized light is converted into elliptically polarized light. The elliptically polarized light emerging from the liquid crystal panel 3 that vibrates in the direction parallel to the transmission axis of the absorptive polarizing plate 4 passes through the absorptive polarizing plate 4 to be emitted as reflected light to the front surface side. The elliptically polarized light emerging from the liquid crystal panel 3 that vibrates in the direction perpendicular to the transmission axis (parallel to the absorption axis) of the absorptive polarizing plate 4 is absorbed by the absorptive polarizing plate 4.

Thereby, a mirror image is visible by reflected light in the mirror mode. In addition, the liquid crystal panel 3 includes segment electrodes. Voltage application to part(s) of the pixels (pixel regions PR) thus enables display of information such as letters and images by reflected light. Here, variation in polarization state caused by the birefringence and variations in transmittance and reflectance that accompany the polarization state variation involve large wavelength dispersion. The intensity of reflected light thus changes according to the wavelength. Namely, the reflected light is colored in the mirror mode. In the pixels with no voltage applied, an image provided by the liquid crystal panel 20 for display is visible.

The following is the description of the case where, in the switching mirror panel 1a, the transmission axis of the reflective polarizing plate 2 and the transmission axis of the absorptive polarizing plate 4 are perpendicular to each other. In the liquid crystal display device 18, the transmission axis of the absorptive polarizing plate 4a and the transmission axis of the absorptive polarizing plate 4b are perpendicular to each other. The transmission axis of the reflective polarizing plate 2 and the transmission axis of the absorptive polarizing plate 4b are parallel to each other.

(Transparent Mode)

The transparent mode is achieved when voltage is applied (when sufficient voltage is applied so as to cause birefringence) in the liquid crystal panel 3. This will be specifically described below.

When the liquid crystal panel 20 for display provides an image (display mode), linearly polarized light emitted from the liquid crystal display device 18 (linearly polarized light emerging from the absorptive polarizing plate 4b) passes through the reflective polarizing plate 2 whose transmission axis is parallel to the transmission axis of the absorptive polarizing plate 4b. The polarization state of the linearly polarized light emerging from the reflective polarizing plate 2 is altered by the birefringence effects of the liquid crystal panel 3 (coloring mode) as it passes through the liquid crystal panel 3 (with voltage applied), and the linearly polarized light is converted into elliptically polarized light. The elliptically polarized light emerging from the liquid crystal panel 3 that vibrates in the direction parallel to the transmission axis of the absorptive polarizing plate 4 passes through the absorptive polarizing plate 4. In contrast, the elliptically polarized light emerging from the liquid crystal panel 3 that vibrates in the direction perpendicular to the transmission axis (parallel to the absorption axis) of the absorptive polarizing plate 4 is absorbed by the absorptive polarizing plate 4. Thereby, despite the existence of the switching mirror panel 1a, the image provided by the liquid crystal panel 20 for display is visible as in the case without the switching mirror panel 1a.

Thereby, the image provided by the liquid crystal panel 20 for display is visible in the transparent mode. Here, variation in polarization state caused by the birefringence and variation in transmittance that accompanies the polarization state variation involve large wavelength dispersion. Light emitted from the liquid crystal display device 18 thus changes its intensity according to the wavelength. Namely, the emitted light is colored in the transparent mode. In the transparent mode, the liquid crystal panel 20 for display may be in a non-display state.

(Mirror Mode)

The mirror mode is achieved when no voltage is applied (when sufficient voltage is not applied so as to prevent birefringence) in the liquid crystal panel 3. This will be specifically described below.

The liquid crystal panel 20 for display is in a non-display state. Here, the liquid crystal panel 20 for display preferably provides no display entirely or partially. Providing no display may be achieved by emitting no display light from the liquid crystal display device 18 by providing black display or, turning out or toning down the backlight 19.

Light incident on the absorptive polarizing plate 4 from the front surface side that vibrates in the direction parallel to the transmission axis of the absorptive polarizing plate 4 passes through the absorptive polarizing plate 4 to be converted into linearly polarized light. Here, the liquid crystal panel 3 has zero retardation. The linearly polarized light emerging from the absorptive polarizing plate 4 thus passes through the liquid crystal panel 3 (with no voltage applied) while holding its polarization state (non-coloring mode). The linearly polarized light emerging from the liquid crystal panel 3 is reflected by the reflective polarizing plate 2 whose reflection axis is parallel to the transmission axis of the absorptive polarizing plate 4. The linearly polarized light reflected by reflective polarizing plate 2 passes through the liquid crystal panel 3 and then the absorptive polarizing plate 4 to be emitted as reflected light to the front surface side.

Thereby, a mirror image is visible by reflected light in the mirror mode. In addition, the liquid crystal panel 3 includes segment electrodes. No voltage application to part(s) of the pixels (pixel regions PR) enables display of information such as letters and images by reflected light. In this case, reflected light is colorless (achromatic). In the pixels with voltage applied, an image provided by the liquid crystal panel 20 for display is visible.

Modified Example 1 of Embodiment 1

Figure 4:
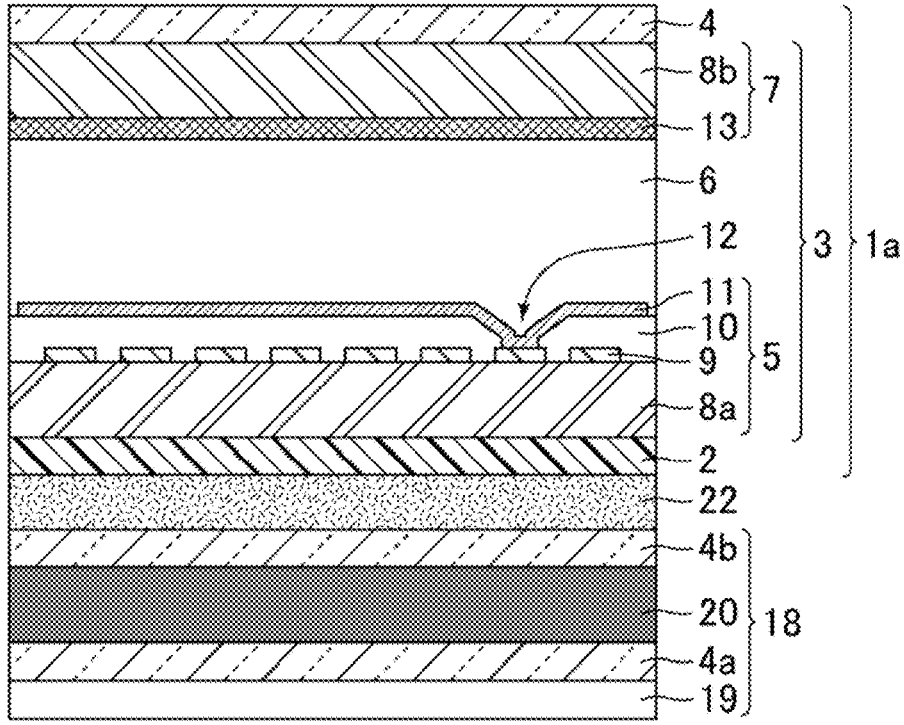
FIG. 4 is a schematic cross-sectional view of a switching mirror device of Modified Example 1 of Embodiment 1.

FIG. 4 is a schematic cross-sectional view of a switching mirror device of Modified Example 1 of Embodiment 1. The switching mirror device of Modified Example 1 of Embodiment 1 is the same as the switching mirror device of Embodiment 1 except that the switching mirror panel and the liquid crystal display device are bonded together with a pressure-sensitive adhesive in between. Duplicate explanations thus will be appropriately omitted.

A switching mirror device 17b includes, in the following order from the back surface side to the front surface side, the liquid crystal display device 18 and the switching mirror panel 1a. The switching mirror panel 1a and the liquid crystal display device 18 are bonded together with a pressure-sensitive adhesive 22 in between.

Examples of the pressure-sensitive adhesive 22 include an optically clear adhesive (OCA) sheet.

Modified Example 2 of Embodiment 1

Figure 5:
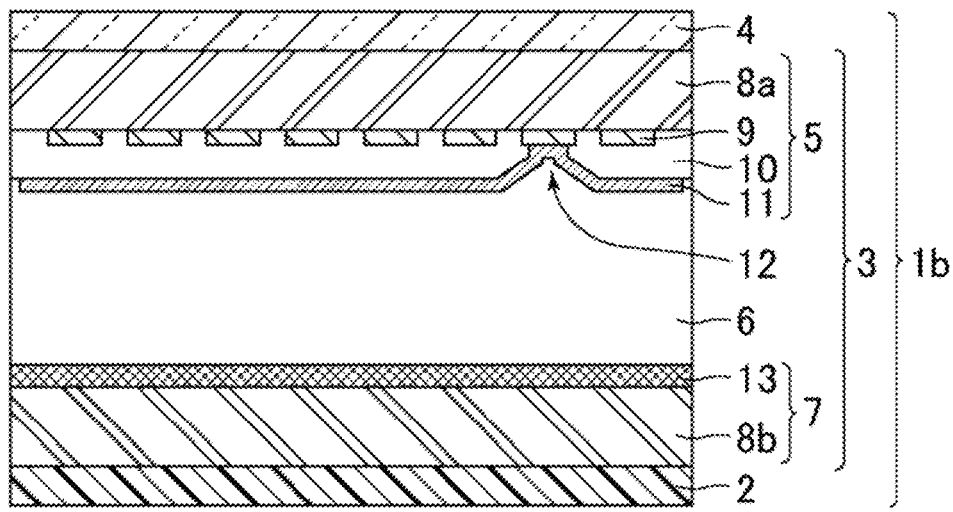
FIG. 5 is a schematic cross-sectional view of a switching mirror device of Modified Example 2 of Embodiment 1.
Figure 5:
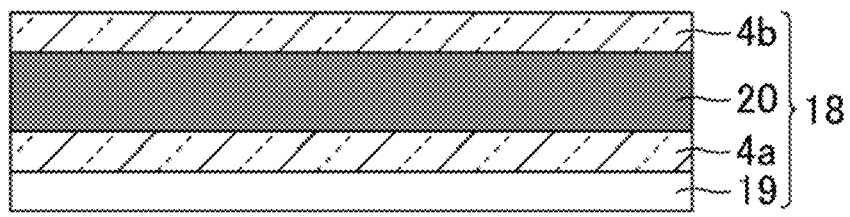

FIG. 5 is a schematic cross-sectional view of a switching mirror device of Modified Example 2 of Embodiment 1. The switching mirror device of Modified Example 2 of Embodiment 1 is the same as the switching mirror device of Embodiment 1 except that the positions of the array substrate and the counter substrate are swapped. Duplicate explanations thus will be appropriately omitted.

A switching mirror device 17c includes, in the following order from the back surface side to the front surface side, the liquid crystal display device 18 and a switching mirror panel 1b. In the switching mirror panel 1b, the liquid crystal panel 3 includes, in the following order from the back surface side to the front surface side, the counter substrate 7, the liquid crystal layer 6, and the array substrate 5.

Embodiment 2

Figure 6:
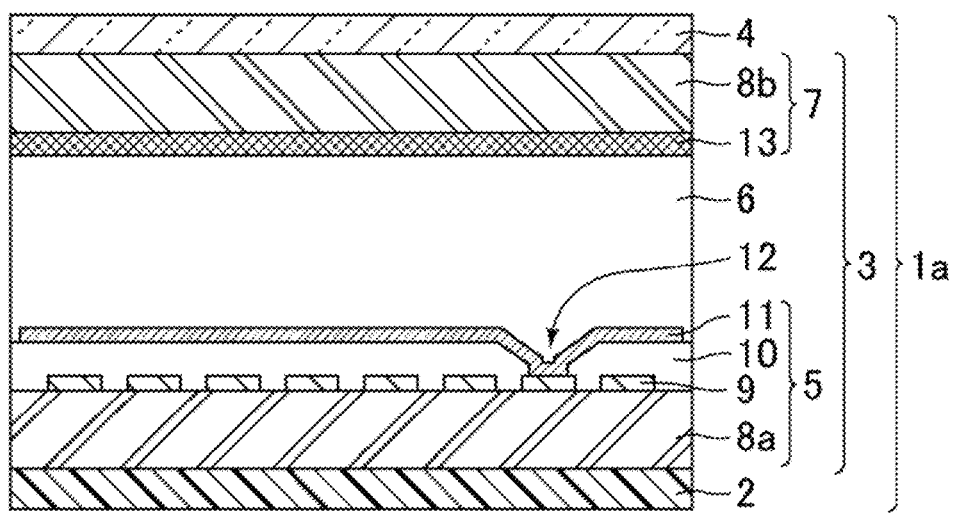
FIG. 6 is a schematic cross-sectional view of a switching mirror device of Embodiment 2.
Figure 6:

FIG. 6 is a schematic cross-sectional view of a switching mirror device of Embodiment 2. The switching mirror device of Embodiment 2 is the same as the switching mirror device of Embodiment 1 except that a light absorber is disposed in place of the liquid crystal display device. Duplicate explanations thus will be appropriately omitted.

A switching mirror device 17d includes, in the following order from the back surface side to the front surface side, a light absorber 21 and the switching mirror panel 1a. The switching mirror panel 1a and the light absorber 21 may be disposed with an air layer placed in between or may be bonded together with a pressure-sensitive adhesive in between.

Examples of the light absorber 21 include a black component (e.g., plastic plate, acrylic plate), an orange component (e.g., plastic plate, acrylic plate), a poster, and a photograph. The term "light absorber" herein indicates a component whose light absorption rate is 30% or greater. The light absorber 21 is preferably a non-self-luminous body. The term "non-self-luminous body" herein indicates a body that does not emit light itself, which is different from a body that emits light itself such as a display device (e.g., liquid crystal display device, organic electroluminescence display device).

When the switching mirror panel 1a is in the transparent mode, the light absorber 21 is visible. Using a black plastic plate as the light absorber 21 provides black display.

When the switching mirror panel 1a is in the mirror mode, a mirror image is visible by reflected light. In addition, the liquid crystal panel 3 includes segment electrodes. Driving part(s) of the pixels (pixel regions PR) in the mirror mode enables displaying information such as letters and images by reflected light. In contrast, in the pixels not in the mirror mode, i.e., in the pixels in the transparent mode, the light absorber 21 is visible.

As described above, variation in voltage applied to the liquid crystal panel 3 of the switching mirror panel 1a enables switching between the state of displaying the light absorber 21 (e.g., black display state) and the mirror state. In addition, if the liquid crystal panel 3 is a birefringence mode liquid crystal panel (e.g., VA-ECB-mode liquid crystal panel), adjusting the voltage applied to the liquid crystal panel 3 enables varying the color of reflected light in the mirror mode (in the case where the transmission axis of the reflective polarizing plate 2 and the transmission axis of the absorptive polarizing plate 4 are parallel to each other) and varying the color of transmitted light in the transparent mode (in the case where the transmission axis of the reflective polarizing plate 2 and the transmission axis of the absorptive polarizing plate 4 are perpendicular to each other).

Embodiment 3

Figure 7:
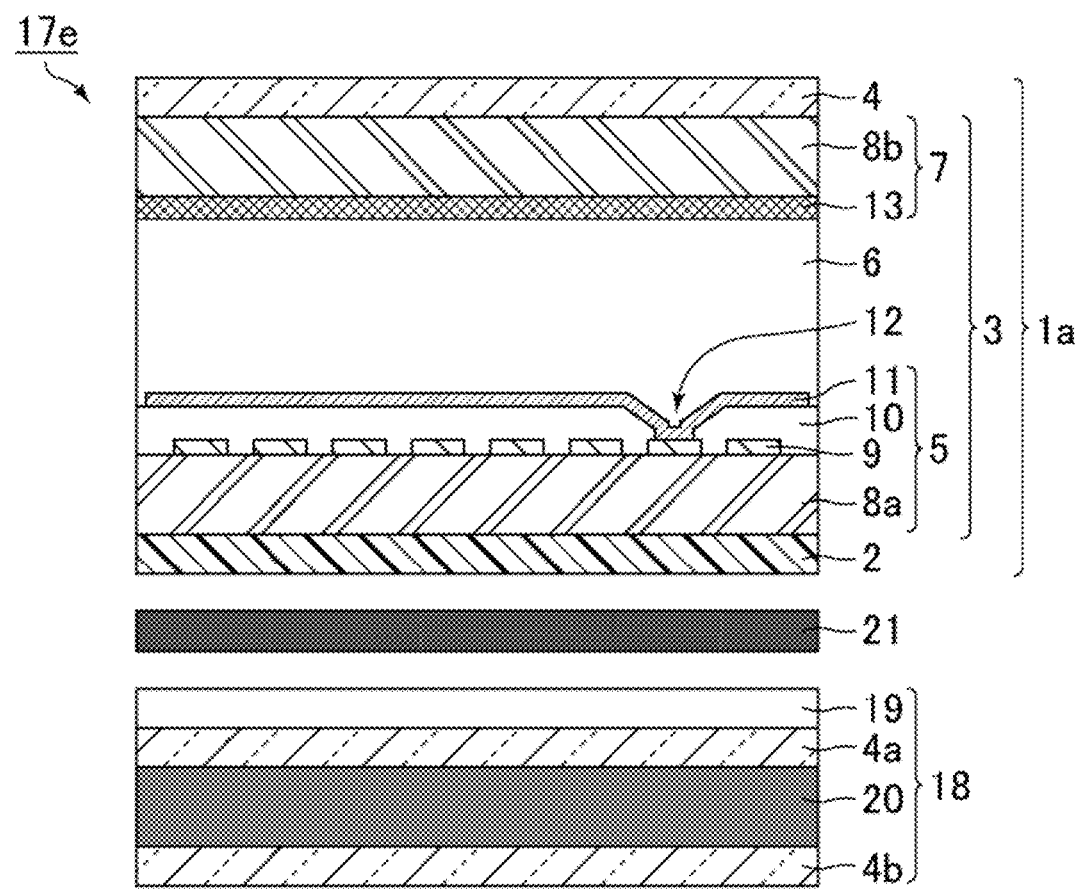
FIG. 7 is a schematic cross-sectional view of a switching mirror device of Embodiment 3.

FIG. 7 is a schematic cross-sectional view of a switching mirror device of Embodiment 3. The switching mirror device of Embodiment 3 is the same as the switching mirror device of Embodiment 2 except that a liquid crystal display device is disposed on the back surface side of the light absorber. Duplicate explanations thus will be appropriately omitted.

A switching mirror device 17e includes, in the following order from the back surface side to the front surface side, the liquid crystal display device 18, the light absorber 21, and the switching mirror panel 1a. The light absorber 21 and the liquid crystal display device 18 may be disposed with an air layer placed in between or may be bonded together with a pressure-sensitive adhesive in between.

The liquid crystal display device 18 includes, in the following order from the back surface side to the front surface side, the absorptive polarizing plate 4b, the liquid crystal panel 20 for display, the absorptive polarizing plate 4a, and the backlight 19. The absorptive polarizing plate 4a may be bonded to the front surface side of the liquid crystal panel 20 for display with a pressure-sensitive adhesive or the like. The absorptive polarizing plate 4b may be bonded to the back surface side of the liquid crystal panel 20 for display with a pressure-sensitive adhesive or the like. In the present embodiment, the liquid crystal display device 18 is viewed from the back surface side (the absorptive polarizing plate 4b side). In other words, the liquid crystal display device 18 has a display surface on the opposite side of the light absorber 21. The present embodiment assumes that the combination of the switching mirror panel 1a and the light absorber 21 is used as a cover for covering the liquid crystal display device 18 (e.g., a smartphone, a tablet terminal) on the opposite side of the display surface.

When the switching mirror panel 1a is in the transparent mode, the light absorber 21 is visible. Using a black plastic plate as the light absorber 21 provides black display.

When the switching mirror panel 1a is in the mirror mode, a mirror image is visible by reflected light. In addition, the liquid crystal panel 3 includes segment electrodes. Driving part(s) of the pixels (pixel regions PR) in the mirror mode enables displaying information such as letters and images by reflected light. In contrast, in the pixels not in the mirror mode, i.e., in the pixels in the transparent mode, the light absorber 21 is visible.

As described above, variation in voltage applied to the liquid crystal panel 3 of the switching mirror panel 1a enables the cover of the liquid crystal display device 18 to switch between the state of displaying the light absorber 21 (e.g., black display state) and the mirror state. In addition, if the liquid crystal panel 3 is a birefringence mode liquid crystal panel (e.g., VA-ECB-mode liquid crystal panel), adjusting the voltage applied to the liquid crystal panel 3 enables varying the color of reflected light in the mirror mode (in the case where the transmission axis of the reflective polarizing plate 2 and the transmission axis of the absorptive polarizing plate 4 are parallel to each other) and varying the color of transmitted light in the transparent mode (in the case where the transmission axis of the reflective polarizing plate 2 and the transmission axis of the absorptive polarizing plate 4 are perpendicular to each other).

Embodiment 4

Figure 8:
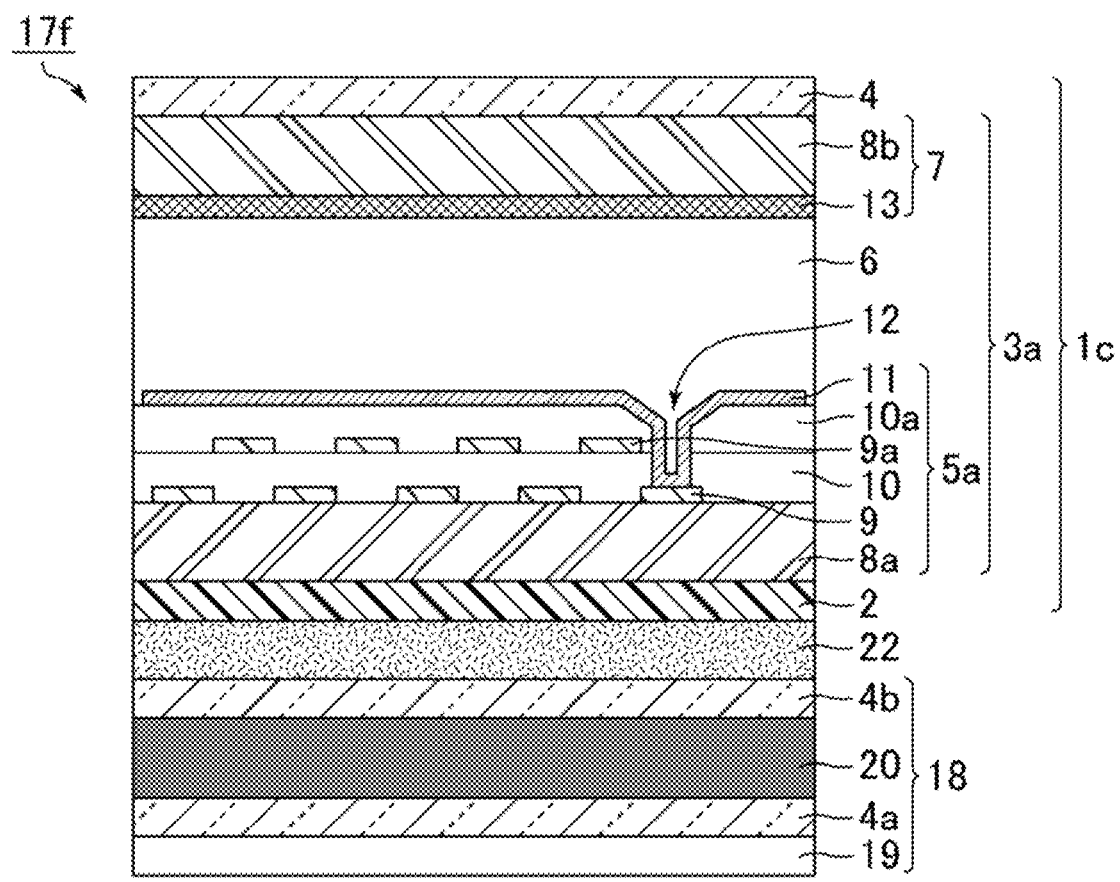
FIG. 8 is a schematic cross-sectional view of a switching mirror device of Embodiment 4.

FIG. 8 is a schematic cross-sectional view of a switching mirror device of Embodiment 4. The switching mirror device of Embodiment 4 is the same as the switching mirror device of Embodiment 1 except that the array substrate in the liquid crystal panel of the switching mirror panel has a different configuration. Duplicate explanations thus will be appropriately omitted.

A switching mirror device 17f includes, in the following order from the back surface side to the front surface side, the liquid crystal display device 18 and a switching mirror panel 1c. The switching mirror panel 1c and the liquid crystal display device 18 are bonded together with the pressure-sensitive adhesive 22 in between. The switching mirror panel 1c and the liquid crystal display device 18 may be disposed with an air layer in between.

The switching mirror panel 1c includes, in the following order from the back surface side to the front surface side, the reflective polarizing plate 2, a liquid crystal panel 3a, and the absorptive polarizing plate 4.

The liquid crystal panel 3a includes an array substrate 5a, the counter substrate 7 facing the array substrate 5a, and the liquid crystal layer 6 disposed between the substrates. The array substrate 5a and the counter substrate 7 are bonded together via a sealing material (not illustrated), with the liquid crystal layer 6 interposed between the substrates 5a and 7.

The array substrate 5a includes the transparent substrate 8a, the transparent conductive lines 9 disposed on the surface of the transparent substrate 8a on the liquid crystal layer 6 side, the transparent insulating film 10 covering the transparent conductive lines 9, transparent conductive lines 9a disposed on the surface of the transparent insulating film 10 on the liquid crystal layer 6 side, a transparent insulating film 10a covering the transparent conductive lines 9a, and the pixel electrode 11 disposed on the surface of the transparent insulating film 10a on the liquid crystal layer 6 side. The transparent conductive lines 9 and the transparent conductive lines 9a are superimposed on the pixel electrode 11. The transparent conductive lines 9 and the transparent conductive lines 9a are disposed at an equal pitch (the distance between two adjacent transparent conductive lines (the distance in the direction crossing the transparent conductive lines); slit width) with the transparent insulating film 10 disposed in between, and are not superimposed on each other. The pixel electrode 11 is electrically connected to at least one of the transparent conductive lines 9 (only one line in FIG. 8) at the contact part 12 through an aperture formed in the transparent insulating film 10 and the transparent insulating film 10a.

The transparent conductive lines 9a may be made of ITO, IZO, or ZnO, for example, as in the material for the transparent conductive lines 9.

The transparent insulating film 10a may be an organic insulating film or a nitride film as in the material for the transparent insulating film 10.

The following is an exemplary production method of the array substrate 5a.

(1) Formation of Transparent Conductive Lines

First, a transparent conductive material (e.g., ITO) is applied to the transparent substrate 8a by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form transparent conductive lines 9.

(2) Formation of Transparent Insulating Film

The transparent conductive lines 9 are covered with a transparent insulating material (e.g., organic insulating film). The transparent insulating material applied thereto is sequentially exposed, developed, and baked to form the transparent insulating film 10 in which an aperture is formed.

(3) Formation of Additional Transparent Conductive Lines

A transparent conductive material (e.g., ITO) is applied to the transparent insulating film 10 by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form additional transparent conductive lines 9a are formed.

(4) Formation of Additional Transparent Insulating Film

The additional transparent conductive lines 9a are covered with a transparent insulating material (e.g., organic insulating film). The transparent insulating material applied thereto is sequentially exposed, developed, and baked to form an additional transparent insulating film 10a in which an aperture is formed at the same position as that of the transparent insulating film 10.

(5) Formation of Pixel Electrodes

A transparent conductive material (e.g., ITO) is applied to the additional transparent insulating film 10a by the sputtering method to form a transparent conductive film. Next, a resist is applied to the transparent conductive film and is sequentially exposed, baked, and developed (photolithography method) to form a resist pattern. The transparent conductive film is etched through the resist pattern, followed by stripping of the resist pattern, to provide patterning on the transparent conductive film. The patterned transparent conductive film is then baked to form the pixel electrodes 11. Through the above steps, the array substrate 5a is obtained.

In the switching mirror device of Embodiment 1, the liquid crystal panel of the switching mirror panel and the liquid crystal panel for display of the liquid crystal display device are stacked as described above. The present inventors found through studies that this configuration may cause moiré appearance in the transparent mode (e.g., when an image is provided by the liquid crystal panel for display). The present inventors investigated the reason of moiré appearance to find the following. That is, some patterns formed by the transparent conductive lines (slit patterns formed by the transparent conductive lines) disposed on the array substrate of a liquid crystal panel may interfere with the configuration pattern of pixels (e.g., arrangement pattern of a color filter layer and black matrix) of the liquid crystal panel for display to cause moiré appearance. Moiré is a phenomenon in which superposing two striped patterns with different periods or superposing (crossing) two striped patterns with the same period with an angle causes another striped pattern with a period different from that (those) of the two striped patterns.

The present inventors variously studied a method for preventing moiré appearance to find that inserting a light diffusion layer such as a light diffusion sheet or a light diffusion paste between the switching mirror panel and the liquid crystal display device achieves prevention of moiré appearance. The present inventors, however, further studied to find that such a configuration blurs a displayed image of the liquid crystal panel for display due to light scattering effects caused by the light diffusion layer. The present inventors also found that such blurring of a displayed image occurs more remarkably in a liquid crystal panel for display with higher definition.

Meanwhile, in the present embodiment, the transparent conductive lines 9 and the transparent conductive lines 9a, having the transparent insulating film 10 in between, are disposed at an equal pitch (the distance between two adjacent transparent conductive lines; slit width) and are not superimposed on each other. Accordingly, the switching mirror panel 1c in a planar view can be recognized as if no slits existed between the transparent conductive lines, thereby sufficiently preventing moiré appearance as described above. In addition, the transparent conductive lines 9 and the transparent conductive lines 9a are disposed in two layers in the present embodiment. This configuration increases the number of the pixel electrodes 11 that can drive, imparting high resolution to the liquid crystal panel 3a.

The present invention is described below in more detail based on examples and comparative examples. The examples, however, are not intended to limit the scope of the present invention.

Example 1

A switching mirror device of Embodiment 1 was produced. The components of the switching mirror device of Example 1 were as follows. The directions of transmission axes, reflection axes, and absorption axes, rubbing directions, and alignment directions are each defined to be positive (+) in the clockwise direction from the reference line (0°) which is the longitudinal direction (long side) of the switching mirror device.

(Switching Mirror Panel 1a)

The switching mirror panel 1a was formed by bonding the reflective polarizing plate 2 to the back surface side of the liquid crystal panel 3 and bonding the absorptive polarizing plate 4 to the front surface side of the liquid crystal panel 3. The components of the switching mirror panel 1a were as follows.

(Reflective Polarizing Plate 2)

Reflective polarizing plate (trade name: DBEF) available from 3M Japan Limited
 Direction of the transmission axis: 0°
 Direction of the reflection axis: 90°

(Liquid Crystal Panel 3)

A TN-mode liquid crystal panel produced as follows was used. First, the array substrate 5 and the counter substrate 7 were washed and a horizontal alignment film was formed on each substrate. The horizontal alignment film formed thereon was prebaked and then post-baked. The post-baked horizontal alignment films were subjected to rubbing treatment such that the rubbing directions of the array substrate 5 and the counter substrate 7 were perpendicular to each other (rubbing direction of the array substrate 5: 0°, rubbing direction of the counter substrate 7: 90°) when the two substrates were bonded together. The array substrate 5 and the counter substrate 7 were then washed. Plastic bead spacers (diameter: 3 µm) were scattered on the array substrate 5, and a sealing material was applied to the counter substrate 7 by a seal printing method. The array substrate 5 and the counter substrate 7 were bonded together and then baked. Next, a liquid crystal material (refractive index anisotropy Δn: 0.14, anisotropy of dielectric constant Δε: 9) was injected between the array substrate 5 and the counter substrate 7, followed by sealing, to form the liquid crystal layer 6 (thickness d: 3 µm). The liquid crystal layer 6 was then subjected to realignment treatment. As a result, the liquid crystal panel 3 (TN-mode liquid crystal panel) was obtained. The array substrate 5 of the liquid crystal panel 3 was connected to the integrated circuit 14 (COG driver) and the flexible printed circuit board 15.

(Array Substrate 5)

The array substrate 5 was formed as follows.

(1) Formation of Transparent Conductive Lines

First, a transparent conductive material (ITO) was applied to the transparent substrate 8a (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form transparent conductive lines 9.

(2) Formation of Transparent Insulating Film

The transparent conductive lines 9 were covered with a transparent insulating material (organic insulating film). The transparent insulating material applied thereto was sequentially exposed, developed, and baked to form the transparent insulating film 10 in which apertures were formed.

(3) Formation of Pixel Electrodes

A transparent conductive material (ITO) was applied to the transparent insulating film 10 by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the pixel electrodes 11. Through the above steps, the array substrate 5 was obtained.

(Counter Substrate 7)

The counter substrate 7 was formed as follows. First, a transparent conductive material (ITO) was applied to the transparent substrate 8b (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form the common electrode 13. Through the above steps, the counter substrate 7 was obtained.

(Absorptive Polarizing Plate 4)

A polarizer formed by aligning an iodine complex on a PVA film by adsorption
 Direction of the transmission axis: 90°
 Direction of the absorption axis: 0°
 Main transmittance k1: 84%

(Liquid Crystal Display Device 18)

The liquid crystal display device 18 included, in the following order from the back surface side to the front surface side, the backlight 19, the absorptive polarizing plate 4a, the liquid crystal panel 20 for display, and the absorptive polarizing plate 4b. The absorptive polarizing plate 4a, the liquid crystal panel 20 for display, and the absorptive polarizing plate 4b were as follows.

(Absorptive Polarizing Plate 4a)
A polarizer formed by aligning an iodine complex on a PVA film by adsorption
Direction of the transmission axis: 90°
Direction of the absorption axis: 0°
Main transmittance k1: 84%
(Liquid Crystal Panel 20 for Display)
MVA-mode liquid crystal panel
Alignment directions (the directions in which liquid crystal molecules are tilted when voltage is applied): 45°, −45°
(Absorptive Polarizing Plate 4b)
A polarizer formed by aligning an iodine complex on a PVA film by adsorption
Direction of the transmission axis: 0°
Direction of the absorption axis: 90°
Main transmittance k1: 84%

The switching mirror panel 1a and the liquid crystal display device 18 obtained above were housed in a case and were each connected to a drive circuit (e.g., the drive circuit 16), whereby the switching mirror device 17a was produced.

Example 2

A switching mirror device was produced in the same manner as in Example 1 except that the liquid crystal panel 3 and the absorptive polarizing plate 4 were changed as follows.
(Liquid Crystal Panel 3)
A VA-ECB-mode liquid crystal panel produced as follows was used. First, the array substrate 5 and the counter substrate 7 were washed and a vertical alignment film was formed on each substrate. The vertical alignment film formed thereon was prebaked and then post-baked. The post-baked vertical alignment films were subjected to rubbing treatment such that the rubbing directions of the array substrate 5 and the counter substrate 7 were anti-parallel to each other (rubbing direction of the array substrate 5: 225°, rubbing direction of the counter substrate 7: 45°) when the two substrates were bonded together. The array substrate 5 and the counter substrate 7 were then washed. Plastic bead spacers (diameter: 7 μm) were scattered on the array substrate 5, and a sealing material was applied to the counter substrate 7 by a seal printing method. The array substrate 5 and the counter substrate 7 were bonded together and then baked. Next, a liquid crystal material (refractive index anisotropy Δn: 0.2, anisotropy of dielectric constant Δε: −3) was injected between the array substrate 5 and the counter substrate 7, followed by sealing, to form the liquid crystal layer 6 (thickness d: 7 μm). The liquid crystal layer 6 was subjected to realignment treatment. As a result, the liquid crystal panel 3 (VA-ECB-mode liquid crystal panel) was obtained. The array substrate 5 of the liquid crystal panel 3 was connected to the integrated circuit 14 (COG driver) and the flexible printed circuit board 15. The liquid crystal panel 3 had a liquid crystal retardation (Δnd) of 1400 nm when measured with light having a wavelength of 550 nm.
(Absorptive Polarizing Plate 4)
A polarizer formed by aligning an iodine complex on a PVA film by adsorption
Direction of the transmission axis: 0°
Direction of the absorption axis: 90°
Main transmittance k1: 84%

Example 3

The switching mirror device of Modified Example 1 of Embodiment 1 was produced. Specifically, the switching mirror device was produced in the same manner as in Example 2 except that the liquid crystal panel 3, the absorptive polarizing plate 4, and the liquid crystal panel 20 for display were changed as follows and the switching mirror panel 1a and the liquid crystal display device 18 were bonded with the pressure-sensitive adhesive 22 in between.
(Liquid Crystal Panel 3)
Diameter of plastic bead spacers: 6 μm
Liquid crystal retardation: 1200 nm
(Absorptive Polarizing Plate 4)
A polarizer formed by aligning an iodine complex on a PVA film by adsorption
Direction of the transmission axis: 0°
Direction of the absorption axis: 90°
Main transmittance k1: 89%
(Liquid Crystal Panel 20 for Display)
A FFS-mode liquid crystal panel
Rubbing direction of the substrate on the back surface side: 270°
Rubbing direction of the substrate on the front surface side: 90°
(Pressure-Sensitive Adhesive 22)
Optically clear adhesive sheet (trade name: PD-S1) available from Panac Co., Ltd.

Example 4

A switching mirror device was produced in the same manner as in Example 3 except that the anisotropy of dielectric constant Δε of the liquid crystal material in the liquid crystal panel 3 was changed to −5.

Example 5

A switching mirror device was produced in the same manner as in Example 4 except that the main transmittance k1 of the absorptive polarizing plate 4b was changed to 89%.

Example 6

The switching mirror device of Modified Example 2 of Embodiment 1 was produced. Specifically, the switching mirror device was produced in the same manner as in Example 2 except that the positions of the array substrate 5 and the counter substrate 7 were swapped. The rubbing direction of the array substrate 5 was 45° and the rubbing direction of the counter substrate 7 was 225°.

Example 7

The switching mirror panel of Embodiment 1 was produced. Specifically, the switching mirror panel was produced in the same manner as in Example 4 except that the liquid crystal display device 18 was not disposed (was not bonded to the switching mirror panel 1a with the pressure-sensitive adhesive 22 in between).

Example 8

The switching mirror device of Embodiment 2 was produced. Specifically, the switching mirror device was produced in the same manner as in Example 4 except that the liquid crystal display device 18 was not disposed (was not bonded to the switching mirror panel 1a with the pressure-sensitive adhesive 22 in between) and the light absorber 21 was disposed on the back surface side of the switching mirror panel 1*a*. A black plastic plate was employed for the light absorber 21.

Example 9

The switching mirror device of Embodiment 3 was produced. Specifically, the switching mirror device was produced in the same manner as in Example 1 except that the light absorber 21 was disposed between the switching mirror panel 1*a* and the liquid crystal display device 18, and the liquid crystal display device 18 was placed with the display surface (the absorptive polarizing plate 4*b* side) being oriented in the direction opposite to the light absorber 21. A black plastic plate was employed for the light absorber 21.

Example 10

The switching mirror device of Embodiment 4 was produced. Specifically, the switching mirror device was produced in the same manner as in Example 4 except that the array substrate 5 was modified into an array substrate 5*a* as described below.
(Array Substrate 5*a*)
The array substrate 5*a* was formed as follows.
(1) Formation of Transparent Conductive Lines First, a transparent conductive material (ITO) was applied to the transparent substrate 8*a* (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form transparent conductive lines 9.
(2) Formation of Transparent Insulating Film The transparent conductive lines 9 were covered with a transparent insulating material (organic insulating film). The transparent insulating material applied thereto was sequentially exposed, developed, and baked to form the transparent insulating film 10 in which apertures were formed.
(3) Formation of Additional Transparent Conductive Lines A transparent conductive material (ITO) was applied to the transparent insulating film 10 by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form additional transparent conductive lines 9*a*.
(4) Formation of Additional Transparent Insulating Film The additional transparent conductive lines 9*a* were covered with a transparent insulating material (organic insulating film). The transparent insulating material applied thereto was sequentially exposed, developed, and baked to form an additional transparent insulating film 10*a* in which apertures were formed at the same positions as those of the transparent insulating film 10.
(5) Formation of Pixel Electrodes A transparent conductive material (ITO) was applied to the additional transparent insulating film 10*a* by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form the pixel electrodes 11. Through the above steps, the array substrate 5*a* was obtained.

Example 11

A switching mirror device was produced in the same manner as in Example 10 except that the material of the transparent insulating film 10 was changed to a silicon nitride (SiN) film.
(Array Substrate 5*a*)
The array substrate 5*a* was formed as follows.
(1) Formation of Transparent Conductive Lines First, a transparent conductive material (ITO) was applied to the transparent substrate 8*a* (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form transparent conductive lines 9.
(2) Formation of Transparent Insulating Film The transparent conductive lines 9 were covered with a film of a transparent insulating material (SiN film) to form the transparent insulating film 10 (an aperture was not formed at this point) by the plasma CVD method.
(3) Formation of Additional Transparent Conductive Lines A transparent conductive material (ITO) was applied to the transparent insulating film 10 by the sputtering method to form a transparent conductive film. Next, a resist was applied to the transparent conductive film and was sequentially exposed, baked, and developed (photolithography method) to form a resist pattern. The transparent conductive film and the transparent insulating film 10 were etched through the resist pattern, followed by stripping of the resist pattern, to provide patterning on the transparent conductive film, and an aperture was formed in the transparent insulating film 10. The patterned transparent conductive film then baked to form additional transparent conductive lines 9*a*.
(4) Formation of Additional Transparent Insulating Film The additional transparent conductive lines 9*a* were covered with a transparent insulating material (organic insulating film). The transparent insulating material applied thereto was sequentially exposed, developed, and baked to form an additional transparent insulating film 10*a* in which apertures were formed at the same positions as those of the transparent insulating film 10.
(5) Formation of Pixel Electrodes A transparent conductive material (ITO) was applied to the additional transparent insulating film 10*a* by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the pixel electrodes 11. Through the above steps, the array substrate 5a was obtained.

Comparative Example 1

Figure 9:
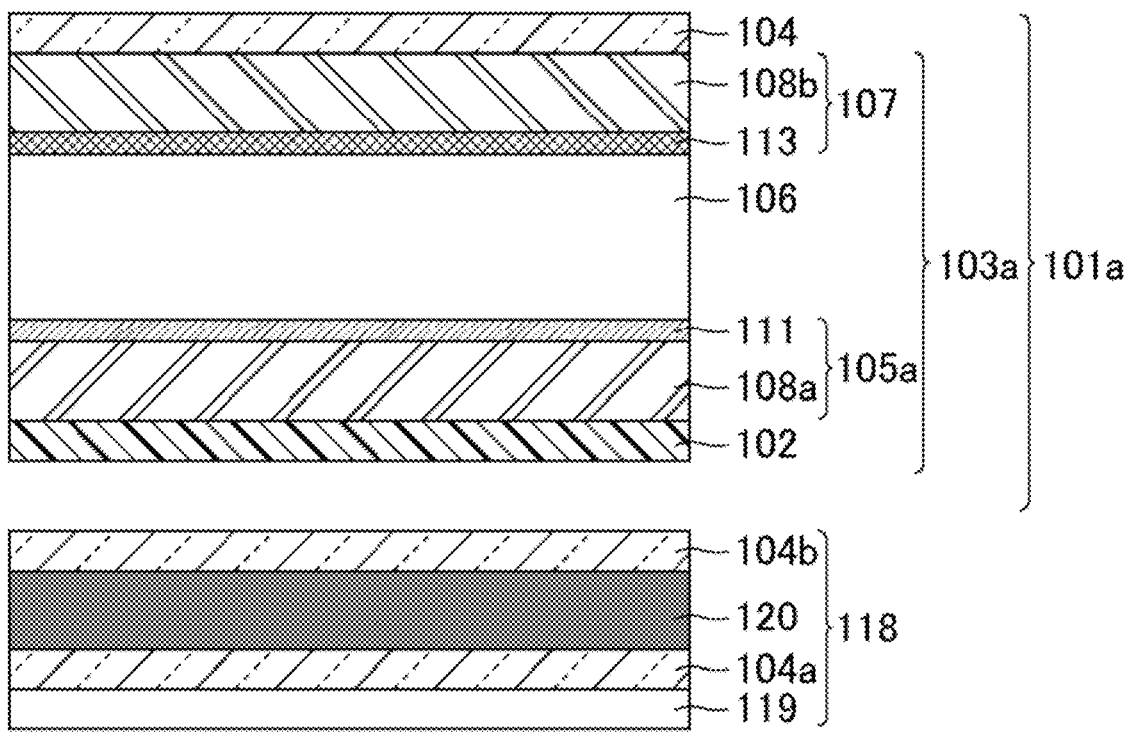
FIG. 9 is a schematic cross-sectional view of a switching mirror device of Comparative Example 1.

FIG. 9 is a schematic cross-sectional view of a switching mirror device of Comparative Example 1. As shown in FIG. 9, a switching mirror device 117a includes, in the following order from the back surface side to the front surface side, a liquid crystal display device 118 and a switching mirror panel 101a.

The switching mirror panel 101a includes, in the following order from the back surface side to the front surface side, a reflective polarizing plate 102, a liquid crystal panel 103a, and an absorptive polarizing plate 104.

The liquid crystal panel 103a includes, in the following order from the back surface side to the front surface side, an array substrate 105a, a liquid crystal layer 106, and a counter substrate 107.

The array substrate 105a includes a transparent substrate 108a and a pixel electrode 111 disposed on the surface of the transparent substrate 108a on the liquid crystal layer 106 side. The pixel electrode 111 is a planar (solid) electrode.

The counter substrate 107 includes a transparent substrate 108b and a common electrode 113 disposed on the surface of the transparent substrate 108b on the liquid crystal layer 106 side. The common electrode 113 is a planar (solid) electrode.

The liquid crystal display device 118 includes, in the following order from the back surface side to the front surface side, a backlight 119, an absorptive polarizing plate 104a, a liquid crystal panel 120 for display, and an absorptive polarizing plate 104b.

The components of the switching mirror device of Comparative Example 1 were as follows. The directions of transmission axes, reflection axes, and absorption axes, rubbing directions, and alignment directions are each defined to be positive (+) in the clockwise direction from the reference line (0°) which is the longitudinal direction (long side) of the switching mirror device.
(Switching Mirror Panel 101a)

The switching mirror panel 101a was formed by bonding the reflective polarizing plate 102 to the back surface side of the liquid crystal panel 103a and bonding the absorptive polarizing plate 104 to the front surface side of the liquid crystal panel 103a. The components of the switching mirror panel 101a were as follows.
(Reflective Polarizing Plate 102)

Reflective polarizing plate (trade name: DBEF) available from 3M Japan Limited
  Direction of the transmission axis: 0°
  Direction of the reflection axis: 90°
(Liquid Crystal Panel 103a)

A TN-mode liquid crystal panel produced as follows was used. First, the array substrate 105a and the counter substrate 107 were washed and a horizontal alignment film was formed on each substrate. The horizontal alignment film formed thereon was prebaked and then post-baked. The post-baked horizontal alignment films were subjected to rubbing treatment such that the rubbing directions of the array substrate 105a and the counter substrate 107 were perpendicular to each other (rubbing direction of the array substrate 105a: 0°, rubbing direction of the counter substrate 107: 90°) when the two substrates were bonded together. The array substrate 105a and the counter substrate 107 were then washed. Plastic bead spacers (diameter: 3 μm) were scattered on the array substrate 105a, and a sealing material was applied to the counter substrate 107 by a seal printing method. The array substrate 105a and the counter substrate 107 were bonded together and then baked. Next, a liquid crystal material (refractive index anisotropy Δn: 0.14, anisotropy of dielectric constant Δε: 9) was injected between the array substrate 105a and the counter substrate 107, followed by sealing, to form the liquid crystal layer 106 (thickness d: 3 μm). The liquid crystal layer 106 was subjected to realignment treatment. As a result, the liquid crystal panel 103a (TN-mode liquid crystal panel) was obtained.
(Array Substrate 105a)

The array substrate 105a was formed as follows. A transparent conductive material (ITO) was applied to the transparent substrate 108a (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form the pixel electrodes 111. Through the above steps, the array substrate 105a was obtained.
(Counter Substrate 107)

The counter substrate 107 was formed as follows. First, a transparent conductive material (ITO) was applied to the transparent substrate 108b (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the common electrode 113. Through the above steps, the counter substrate 107 was obtained.
(Absorptive Polarizing Plate 104)

A polarizer formed by aligning an iodine complex on a PVA film by adsorption
  Direction of the transmission axis: 90°
  Direction of the absorption axis: 0°
  Main transmittance k1: 84%
(Liquid Crystal Display Device 118)

The liquid crystal display device 118 included, in the following order from the back surface side to the front surface side, the backlight 119, the absorptive polarizing plate 104a, the liquid crystal panel 120 for display, and the absorptive polarizing plate 104b. The absorptive polarizing plate 104a, the liquid crystal panel 120 for display, and the absorptive polarizing plate 104b were as follows.
(Absorptive Polarizing Plate 104a)

A polarizer formed by aligning an iodine complex on a PVA film by adsorption
  Direction of the transmission axis: 90°
  Direction of the absorption axis: 0°
  Main transmittance k1: 84%
(Liquid Crystal Panel 120 for Display)
  MVA-mode liquid crystal panel
  Alignment directions (the directions in which liquid crystal molecules are tilted when voltage is applied): 45°, −45°

(Absorptive Polarizing Plate 104b)
A polarizer formed by aligning an iodine complex on a PVA film by adsorption
Direction of the transmission axis: 0°
Direction of the absorption axis: 90°
Main transmittance k1: 84%

The switching mirror panel 101a and the liquid crystal display device 118 obtained above were housed in a case and were each connected to a drive circuit, whereby the switching mirror device 117a was obtained.

Comparative Example 2

A switching mirror device was produced in the same manner as in Comparative Example 1 except that the liquid crystal panel 103a and the absorptive polarizing plate 104 were changed as follows.
(Liquid Crystal Panel 103a)
A VA-ECB-mode liquid crystal panel produced as follows was used. First, the array substrate 105a and the counter substrate 107 were washed and a vertical alignment film was formed on each substrate. The vertical alignment film formed thereon was prebaked and then post-baked. The post-baked vertical alignment films were subjected to rubbing treatment such that the rubbing directions of the array substrate 105a and the counter substrate 107 were anti-parallel to each other (rubbing direction of the array substrate 105a: 225°, rubbing direction of the counter substrate 107: 45°) when the two substrates were bonded together. The array substrate 105a and the counter substrate 107 were then washed. Plastic bead spacers (diameter: 7 μm) were scattered on the array substrate 105a, and a sealing material was applied to the counter substrate 107 by a seal printing method. The array substrate 105a and the counter substrate 107 were bonded together and then baked. Next, a liquid crystal material (refractive index anisotropy Δn: 0.2, anisotropy of dielectric constant Δε: −3) was injected between the array substrate 105a and the counter substrate 107, followed by sealing, to form the liquid crystal layer 106 (thickness d: 7 μm). The liquid crystal layer 106 was subjected to realignment treatment. As a result, the liquid crystal panel 103a (VA-ECB-mode liquid crystal panel) was obtained. The liquid crystal panel 103a had a liquid crystal retardation (Δnd) of 1400 nm when measured with light having a wavelength of 550 nm.
(Absorptive Polarizing Plate 104)
A polarizer formed by aligning an iodine complex on a PVA film by adsorption
Direction of the transmission axis: 0°
Direction of the absorption axis: 90°
Main transmittance k1: 84%

Comparative Example 3

Figure 10:
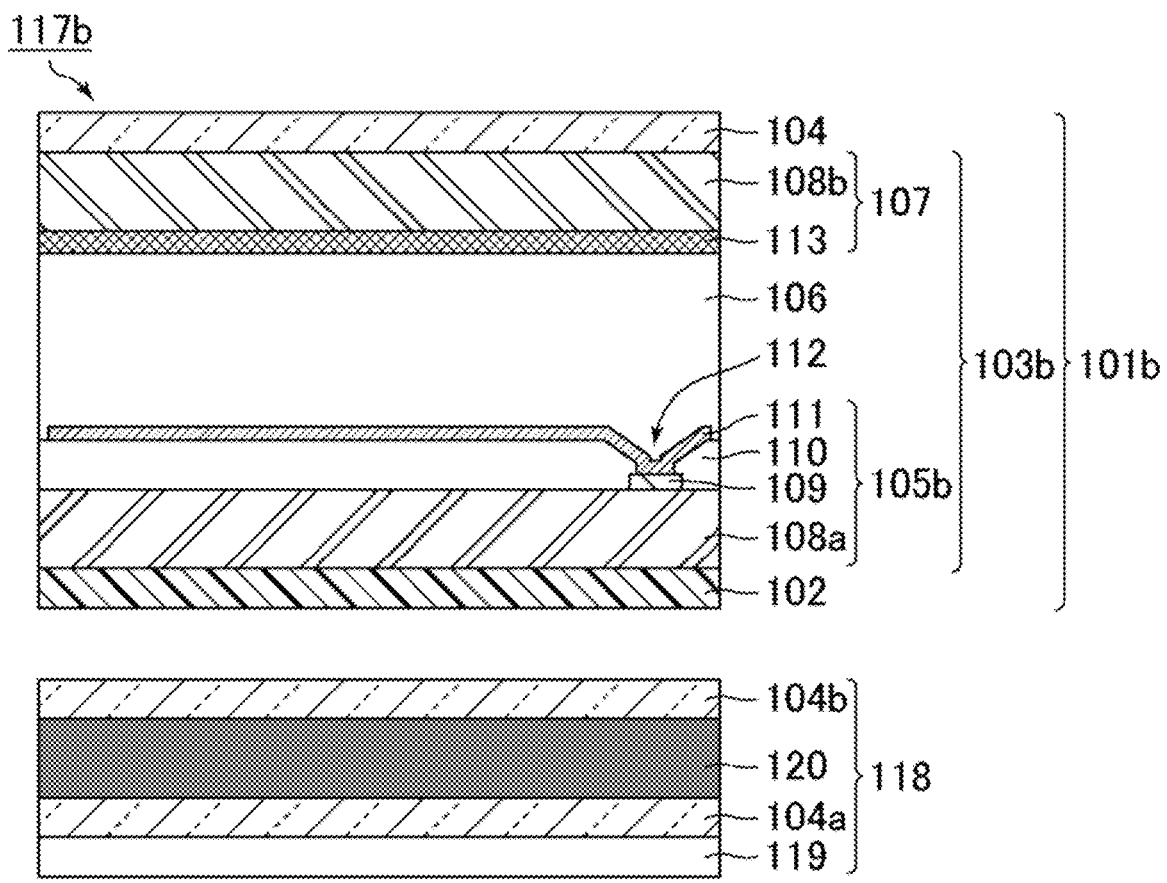
FIG. 10 is a schematic cross-sectional view of a switching mirror device of Comparative Example 3.

FIG. 10 is a schematic cross-sectional view of a switching mirror device of Comparative Example 3. A switching mirror device was produced in the same manner as in Comparative Example 2 except that the configuration of the array substrate was changed.

A switching mirror device 117b includes, in the following order from the back surface side to the front surface side, the liquid crystal display device 118 and a switching mirror panel 101b.

The switching mirror panel 101b includes, in the following order from the back surface side to the front surface side, the reflective polarizing plate 102, a liquid crystal panel 103b, and the absorptive polarizing plate 104.

The liquid crystal panel 103b includes, in the following order from the back surface side to the front surface side, an array substrate 105b, the liquid crystal layer 106, and the counter substrate 107.

The array substrate 105b includes the transparent substrate 108a, a transparent conductive line 109 disposed on the surface of the transparent substrate 108a on the liquid crystal layer 106 side, a transparent insulating film 110 covering the transparent conductive line 109, and the pixel electrode 111 disposed on the surface of the transparent insulating film 110 on the liquid crystal layer 106 side. The transparent conductive line 109 is superimposed on the pixel electrode 111. The pixel electrode 111 is electrically connected to the transparent conductive line 109 at a contact part 112 through an aperture formed in the transparent insulating film 110.

Figure 11:
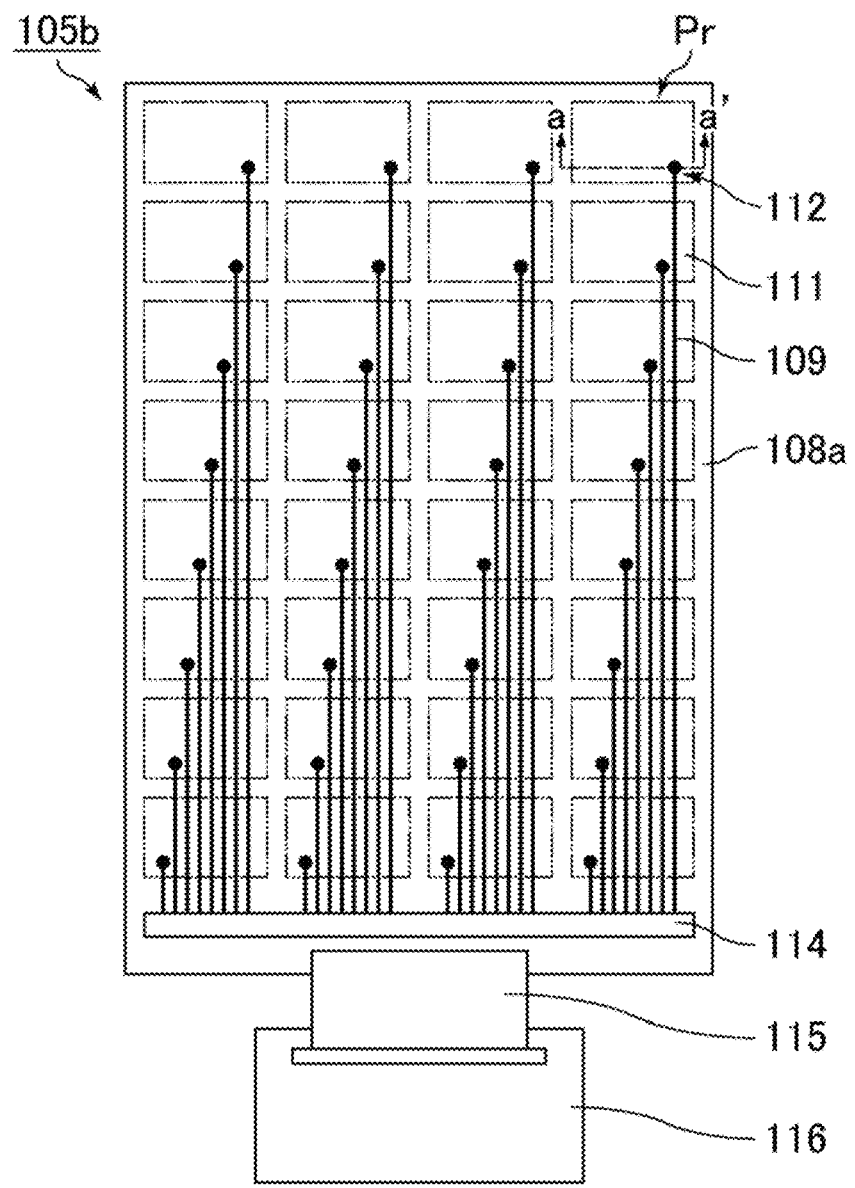
FIG. 11 is a schematic plan view of an array substrate in FIG. 10.

FIG. 11 is a schematic plan view of an array substrate in FIG. 10. FIG. 11 shows an entire view of the array substrate. The cross-sectional view taken along the a-a' line in FIG. 11 corresponds to the cross-sectional view of the array substrate shown in FIG. 10. As shown in FIG. 11, the array substrate 105b includes divided pixel regions Pr. The pixel regions Pr each include, in the order from the liquid crystal layer 106 side and as shown in FIG. 10, the pixel electrode 111, the transparent insulating film 110, and the transparent conductive line 109 superimposed on the pixel electrode 111. In the present comparative example, each pixel electrode 111 functions as a segment electrode. Some pixel regions Pr include transparent conductive lines 109 superimposed on the pixel electrode 111, but not all the pixel regions Pr include transparent conductive lines 109 superimposed on the pixel electrodes 111, unlike the mentioned examples (FIG. 2).

An integrated circuit 114 is disposed at an end of the array substrate 105b (transparent substrate 108a). The integrated circuit 114 is connected to the transparent conductive lines 109. Each of the transparent conductive lines 109 extends from the integrated circuit 114 to the contact part 112 of the corresponding pixel electrode 111, differently from the mentioned examples (FIG. 2). Additionally, the transparent conductive lines 109 have different lengths. A conductive line (not illustrated) drawn from the integrated circuit 114 is connected to an end of a flexible printed circuit board 115. The flexible printed circuit board 115 is connected, at the other end, to a drive circuit 116 for applying voltage to the integrated circuit 114.
(Array Substrate 105b)
The array substrate 105b was formed as follows.
(1) Formation of Transparent Conductive Lines First, a transparent conductive material (ITO) was applied to the transparent substrate 108a (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the transparent conductive lines 109.
(2) Formation of Transparent Insulating Film The transparent conductive line 109 was covered with a transparent insulating material (organic insulating film). The transparent insulating material applied thereto was sequentially exposed, developed, and baked to form the transparent insulating film 110 in which apertures were formed.

(3) Formation of Pixel Electrodes

A transparent conductive material (ITO) was applied to the transparent insulating film 110 by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film then baked to form the pixel electrodes 111. Through the above steps, the array substrate 105b was obtained.

Reference Example 1

Figure 12:
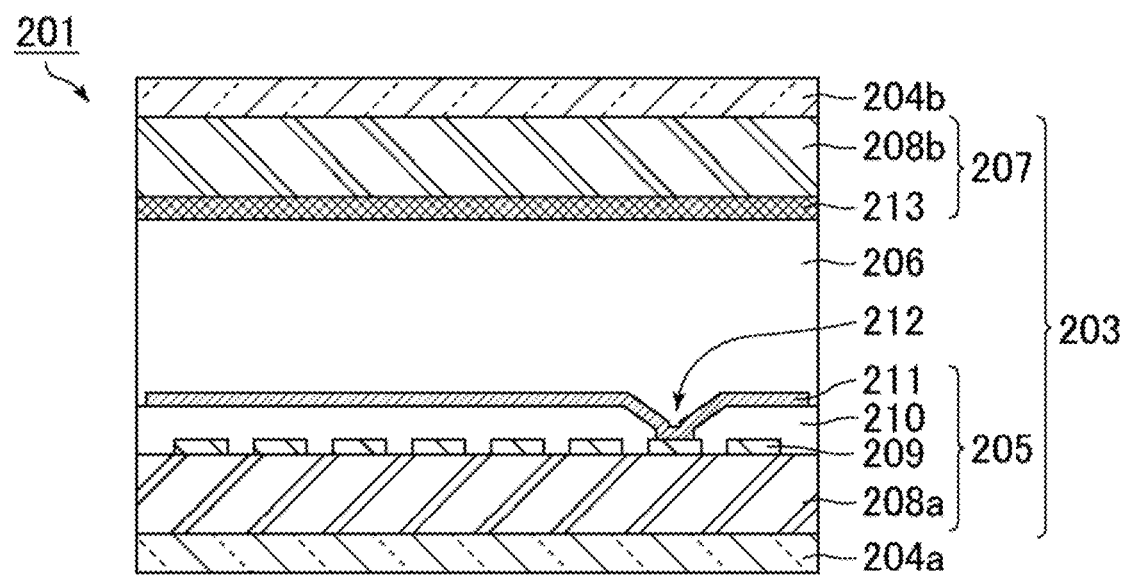
FIG. 12 is a schematic cross-sectional view of a switching mirror panel of Reference Example 1.

The switching mirror panels in the above examples each have a configuration in which a reflective polarizing plate is disposed on the back surface side and an absorptive polarizing plate is disposed on the front surface side. Here, a different configuration is given as a reference example in which an absorptive polarizing plate is disposed on both of the back surface side and front surface side. FIG. 12 is a schematic cross-sectional view of a switching mirror panel of Reference Example 1. As shown in FIG. 12, a switching mirror panel 201 includes, in the following order from the back surface side to the front surface side, an absorptive polarizing plate 204a, a liquid crystal panel 203, and an absorptive polarizing plate 204b.

The liquid crystal panel 203 includes, in the following order from the back surface side to the front surface side, an array substrate 205, a liquid crystal layer 206, and a counter substrate 207.

The array substrate 205 includes a transparent substrate 208a, transparent conductive lines 209 disposed on the surface of the transparent substrate 208a on the liquid crystal layer 206 side, a transparent insulating film 210 covering the transparent conductive lines 209, and a pixel electrode 211 disposed on the surface of the transparent insulating film 210 on the liquid crystal layer 206 side. The transparent conductive lines 209 are superimposed on the pixel electrode 211. The pixel electrode 211 is electrically connected to at least one of the transparent conductive lines 209 (only one line in FIG. 12) at a contact part 212 through an aperture formed in the transparent insulating film 210. The array substrate 205 has the same configuration (such as the length and number of the transparent conductive lines 209) as that shown in FIG. 2.

The counter substrate 207 includes a transparent substrate 208b and a common electrode 213 disposed on the surface of the transparent substrate 208b on the liquid crystal layer 206 side. The common electrode 213 is a planar (solid) electrode.

The switching mirror panel 201 is usable as a see-through display by the following principle.

First, the case where the liquid crystal panel 203 is a TN-mode liquid crystal panel is described. In the configuration in which the transmission axis of the absorptive polarizing plate 204a and the transmission axis of the absorptive polarizing plate 204b are perpendicular to each other, the liquid crystal panel 203 achieves a transparent mode when no voltage is applied (when sufficient voltage is not applied so as to cause optical rotation). Meanwhile, voltage application to the liquid crystal panel 203 gradually reduces the transmittance to achieve the state where light incident on the absorptive polarizing plate 204a from the back surface side cannot pass through the absorptive polarizing plate 204b, that is, a black display state. Thus, the switching mirror panel 201 can provide gray scale display by varying the voltage to be applied.

As described above, voltage application to some pixels of the liquid crystal panel 203 enables displaying information such as letters and images by gray scale display. In contrast, in pixels with no voltage applied, the back surface side of the switching mirror panel 201 is visible.

Next, the case where the liquid crystal panel 203 is a VA-ECB-mode liquid crystal panel is described. In the configuration that the transmission axis of the absorptive polarizing plate 204a and the transmission axis of the absorptive polarizing plate 204b are parallel to each other, the liquid crystal panel 203 achieves a transparent mode when no voltage is applied (when sufficient voltage is not applied so as to prevent birefringence). Meanwhile, voltage application to the liquid crystal panel 203 (the state where sufficient voltage is applied so as to cause birefringence) imparts a color to transmitted light passing through the switching mirror panel 201 from the back surface side by the birefringence of the liquid crystal panel 203. Thus, the switching mirror panel 201 enables color display by varying voltage to be applied.

As described above, voltage application to some pixels of the liquid crystal panel 203 enables displaying information such as letters and images by color display. In contrast, in the pixels with no voltage applied, the back surface side of the switching mirror panel 201 is visible.

In the array substrate 205, the transparent conductive lines 209 are superimposed on the pixel electrode 211, which enables efficient arrangement of the transparent conductive lines 209. Furthermore, the spaces between the pixel regions (pixel electrodes 211) each may be reduced to, for example, the order of several micrometers. Therefore, the pixel regions (pixel electrodes 211) can be recognized as if they constituted one integrated region. As a result, the liquid crystal panel 203, when it is a TN-mode liquid crystal panel, achieves clear gray scale display without feeling of dots. Also, the liquid crystal panel 203, when it is a VA-ECB-mode liquid crystal panel, achieves clear color display without feeling of dots.

Unlike the present reference example, a see-through display including a thin-film transistor array substrate has a reduced transmittance due to the existence of thin-film transistor elements and metal conductive lines. Such a see-through display including a thin-film transistor array substrate thus has a lower transmittance than that in the present reference example. In addition, such a see-through display including a thin-film transistor array substrate is required to include a color filter layer or introduce a field sequential color mode for providing color display. Unfortunately, disposing a color filter layer further reduces the transmittance of the see-through display due to light absorption by the color filter layer. Also, introducing a field sequential color mode requires the liquid crystal panel to have high speed response, possibly causing color break-up.

The switching mirror panel of Reference Example 1 includes the following components. The directions of transmission axes and absorption axes and rubbing directions are each defined to be positive (+) in the clockwise direction from the reference line (0°) which is the longitudinal direction (long side) of the switching mirror panel.

(Absorptive Polarizing Plate 204a)
A polarizer formed by aligning an iodine complex on a PVA film by adsorption
Direction of the transmission axis: 0°
Direction of the absorption axis: 90°
Main transmittance k1: 84%
(Liquid Crystal Panel 203)
A VA-ECB-mode liquid crystal panel produced as follows was used. First, the array substrate 205 and the counter substrate 207 were washed and a vertical alignment film was formed on each substrate. The vertical alignment film formed thereon was prebaked and then post-baked. The post-baked vertical alignment films were subjected to rubbing treatment such that the rubbing directions of the array substrate 205 and the counter substrate 207 were anti-parallel to each other (rubbing direction of the array substrate 205: 225°, rubbing direction of the counter substrate 207: 45°) when the two substrates were bonded together. The array substrate 205 and the counter substrate 207 were then washed. Plastic bead spacers (diameter: 6 μm) were scattered on the array substrate 205, and a sealing material was applied to the counter substrate 207 by a seal printing method. The array substrate 205 and the counter substrate 207 were bonded together and then baked. Next, a liquid crystal material (refractive index anisotropy Δn: 0.2, anisotropy of dielectric constant Δε: −5) was injected between the array substrate 205 and the counter substrate 207, followed by sealing, to form the liquid crystal layer 206 (thickness d: 6 μm). The liquid crystal layer 206 was subjected to realignment treatment. As a result, the liquid crystal panel 203 (VA-ECB-mode liquid crystal panel) was obtained. The liquid crystal panel 203 had a liquid crystal retardation (Δnd) of 1200 nm, when measured with light having a wavelength of 550 nm.
(Array Substrate 205)
The array substrate 205 was formed as follows.
(1) Formation of Transparent Conductive Lines
First, a transparent conductive material (ITO) was applied to the transparent substrate 208a (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the transparent conductive lines 209.
(2) Formation of Transparent Insulating Film
The transparent conductive lines 209 were covered with a transparent insulating material (organic insulating film). The transparent insulating material applied thereto was sequentially exposed, developed, and baked to form the transparent insulating film 210 in which apertures were formed.
(3) Formation of Pixel Electrodes
A transparent conductive material (ITO) was applied to the transparent insulating film 210 by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was then baked to form the pixel electrodes 211. Through the above steps, the array substrate 205 was obtained.

(Counter Substrate 207)
The counter substrate 207 was formed as follows. First, a transparent conductive material (ITO) was applied to the transparent substrate 208b (glass substrate) by the sputtering method to form a transparent conductive film. Next, a resist was applied to the transparent conductive film and was sequentially exposed, baked, and developed (photolithography method) to form a resist pattern. The transparent conductive film was etched through the resist pattern, followed by stripping of the resist pattern, to provide patterning on the transparent conductive film. The patterned transparent conductive film was baked to form the common electrode 213. Through the above steps, the counter substrate 207 was obtained.
(Absorptive Polarizing Plate 204b)
A polarizer formed by aligning an iodine complex on a PVA film by adsorption
Direction of the transmission axis: 0°
Direction of the absorption axis: 90°
Main transmittance k1: 89%
The switching mirror panel of Reference Example 1 had the same configuration as the switching mirror panel of Example 7 except that the reflective polarizing plate 2 was replaced by the absorptive polarizing plate 204a. In the present reference example, an absorptive polarizing plate with high transmittance (main transmittance k1: 89%) was disposed on the front surface side of the liquid crystal panel 203. The absorptive polarizing plate with high transmittance may be disposed on the back surface side of the liquid crystal panel 203 or on both of the front surface side and back surface side of the liquid crystal panel 203. Alternatively, an absorptive polarizing plate not having high transmittance (main transmittance k1: 84%) may be disposed on both of the front surface side and back surface side of the liquid crystal panel 203. Disposing more absorptive polarizing plates with high transmittance improves the transmittance, resulting in a switching mirror panel (see-through display) with higher transmittance. An absorptive polarizing plate with too high transmittance, however, reduces the polarization degree of the absorptive polarizing plate, possibly lowering the contrast ratio.
[Evaluation 1]
The switching mirror devices of Examples 1, 2, and 6, and Comparative Examples 1 and 2 were each evaluated for the specularity in the mirror mode.
(Evaluation Method)
The specularity in the mirror mode was evaluated by determining the visibility of a mirror image. Specifically, in the switching mirror device of each example, the liquid crystal panel for display of the liquid crystal display device was brought to the non-display state (powered off), and voltage (5 V) was applied to all the pixels of the liquid crystal panel of the switching mirror panel (mirror mode). Ten viewers visually observed each switching mirror device from the front surface side under the environment with an illuminance of 750 lx to evaluate the visibility of the mirror image.
(Evaluation Results)
There was no difference in the specularity of the mirror mode between Examples 1, 2, and 6 and Comparative Examples 1 and 2. In Examples 1, 2, and 6, the transparent conductive lines were superimposed on pixel electrodes. The spaces between the pixel regions (pixel electrodes) were thus reduced to the order of several micrometers. This configuration allowed the pixel regions (pixel electrodes) in Examples 1, 2, and 6 to be recognized as if they have constituted one integrated region and to achieve similar specularity to that in Comparative Examples 1 and 2 with planar (solid) pixel electrodes. Additionally, comparison between Example 2 and Example 6 in which the positions of the array substrate and the counter substrate were swapped showed no difference in the specularity of the mirror mode.

[Evaluation 2]

The switching mirror devices of Examples 1 and 2 and Comparative Examples 1 and 2 were evaluated for the information display performance and designability in the mirror mode.

(Evaluation Results)

The switching mirror device of Example 1 in the mirror mode, which could provide information such as letters and images by reflected light, thus achieved better information display performance than that in Comparative Example 1. The switching mirror device of Example 2 in the mirror mode, which not only provided information such as letters and images by reflected light but also changed the color of reflected light and simultaneously imparted colors to reflected light, thus achieved better information display performance and designability than those in Comparative Examples 1 and 2.

[Evaluation 3]

The switching mirror devices of Example 2 and Comparative Example 3 were evaluated for the uniformity of the mirror state in the mirror mode.

(Evaluation Method)

The uniformity of the mirror state in the mirror mode was evaluated by the presence or absence of irregular reflection. Specifically, in the switching mirror device of each example, the liquid crystal panel for display of the liquid crystal display device was brought to the non-display state (powered off), and voltage (5 V) was applied to all the pixels of the liquid crystal panel of the switching mirror panel (mirror mode). Ten viewers visually observed each switching mirror device from the front surface side under the environment with an illuminance of 750 lx to evaluate the presence or absence of irregular reflection.

(Evaluation Results)

No irregular reflection was observed in Example 2. In Example 2, the transparent conductive lines having an equal length achieved an equal parasitic capacitance. The pixel electrodes resultantly had an equal potential, leading to no irregular reflection in the mirror mode. In contrast, irregular reflection was observed in Comparative Example 3. In Comparative Example 3, the transparent conductive lines with different lengths had different potentials that caused the pixel electrodes to have different parasitic capacitances, resulting in irregular reflection in the mirror mode.

[Evaluation 4]

The switching mirror devices of Examples 2 to 4 were evaluated for the applied-voltage dependence of the color of reflected light in the mirror mode.

(Evaluation Method)

The liquid crystal panel for display of the liquid crystal display device of each switching mirror device was brought to the non-display state (powered off). While voltage applied to all the pixels of the liquid crystal panel of the switching mirror panel was increased by 0.1 V from 0 V to 10 V, the reflection chromaticity of each switching mirror device was measured and the xy chromaticity was calculated from the measurement results. The reflection chromaticity was measured using a desktop spectrophotometer (trade name: CM-2600d, integrating sphere spectrophotometer) available from Konica Minolta, Inc. The reflection measurement mode was specular component included (SCI) mode and the measurement wavelength range was from 380 nm to 780 nm. A D65 light source was used as external light incident on each switching mirror device from the front surface side. Changing the voltage applied to the liquid crystal panel from 0 V to 10 V achieved retardation change of the liquid crystal panel from 0 nm to 1145 nm in Example 2, from 0 nm to 930 nm in Example 3, and from 0 nm to 1090 nm in Example 4, when measured with light having a wavelength of 550 nm.

(Evaluation Results)

Figure 13:
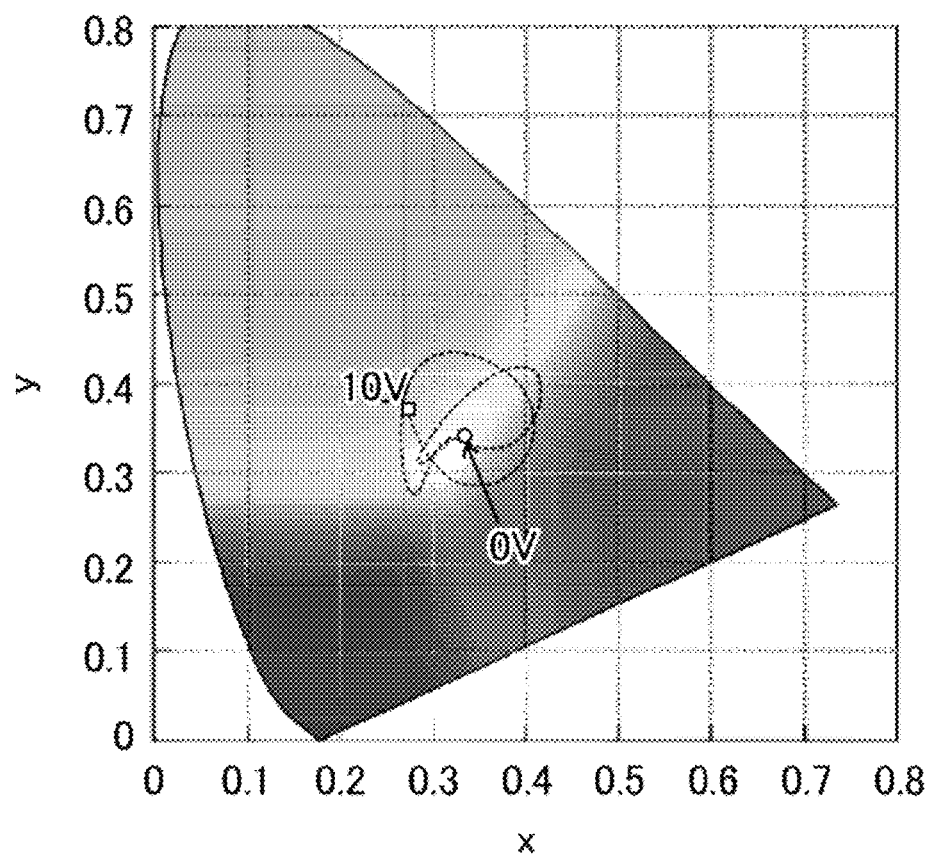
FIG. 13 is an xy chromaticity diagram derived from the measurement results of the reflection chromaticity of a switching mirror device of Example 2.
Figure 14:
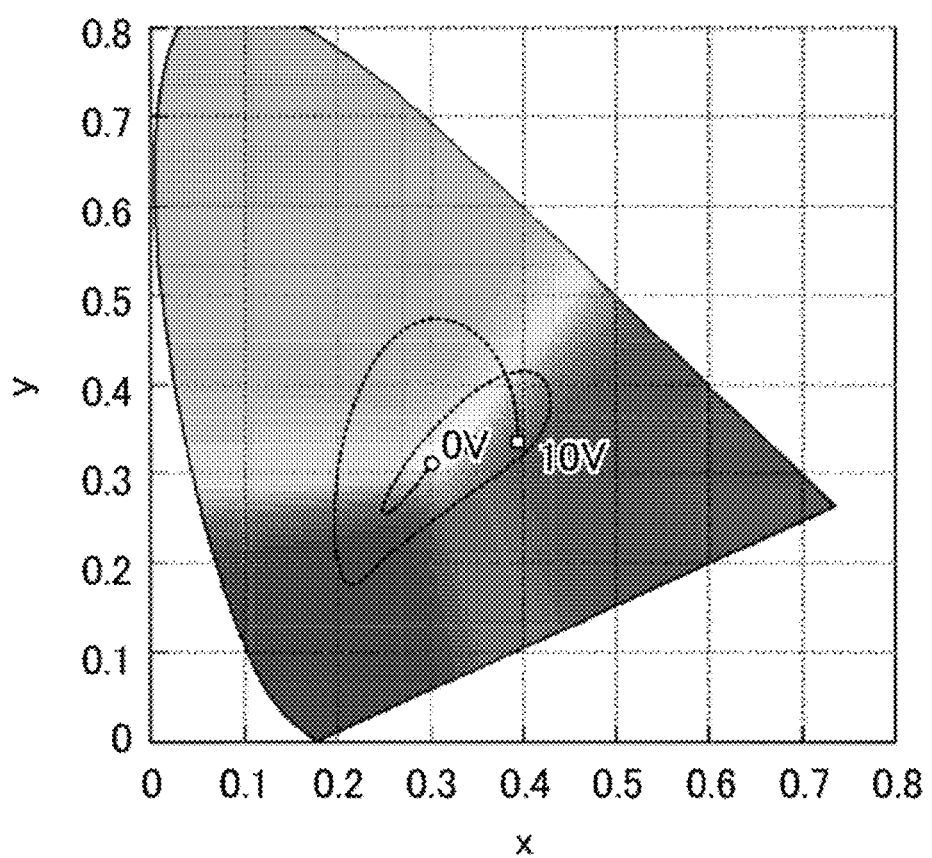
FIG. 14 is an xy chromaticity diagram derived from the measurement results of the reflection chromaticity of a switching mirror device of Example 3.
Figure 15:
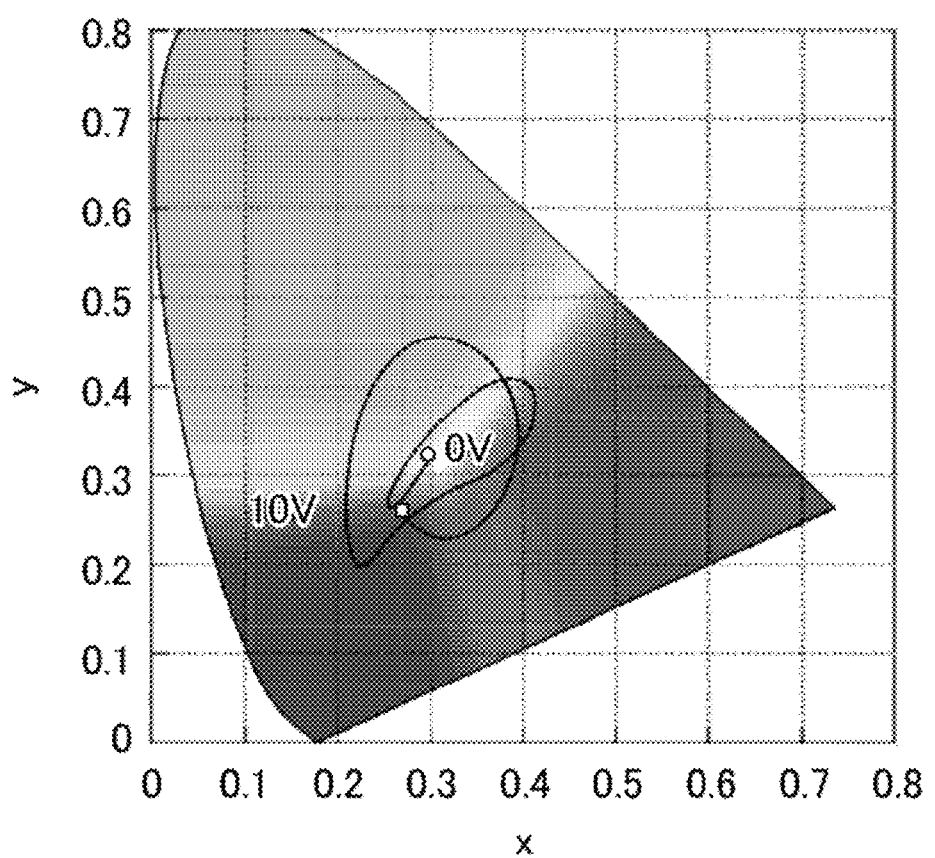
FIG. 15 is an xy chromaticity diagram derived from the measurement results of the reflection chromaticity of a switching mirror device of Example 4.

FIG. 13 is an xy chromaticity diagram derived from the measurement results of the reflection chromaticity of a switching mirror device of Example 2. FIG. 14 is an xy chromaticity diagram derived from the measurement results of the reflection chromaticity of a switching mirror device of Example 3. FIG. 15 is an xy chromaticity diagram derived from the measurement results of the reflection chromaticity of a switching mirror device of Example 4. In FIGS. 13 to 15, "○" (white circle) indicates the chromaticity point representing the reflection chromaticity with a voltage of 0 V applied to the liquid crystal panel; and "□" (white square) indicates the chromaticity point representing the reflection chromaticity with a voltage of 10 V applied to the liquid crystal panel. Changing the voltage applied to the liquid crystal panel from 0 V to 10 V moves the chromaticity point from "○" to "□" along the dotted line. FIGS. 13 to 15 showed that the color of reflected light in Examples 2 to 4 varied in accordance with applied voltage.

[Evaluation 5]

The transmittance in the transparent mode was measured in the switching mirror panels of Examples 1 to 4 and Comparative Example 1.

(Evaluation Method)

First, the luminance L1 of the liquid crystal display device itself was measured from the front surface side in each example. The FFS-mode liquid crystal display device used in Examples 3 and 4 were used as the liquid crystal display device for luminance measurement in each example. Next, the switching mirror panel was placed on the front surface side of the liquid crystal display device to produce a switching mirror device. Then, the liquid crystal panel of the switching mirror panel was brought to the state with no voltage applied (the state where sufficient voltage is not applied so as to cause optical rotation or prevent birefringence), that is, the switching mirror panel was brought to the transparent mode, and the luminance L2 of the switching mirror device was measured from the front surface side. Form the luminance L1 and luminance L2, the transmittance of the switching mirror panel in the transparent mode was calculated according to the formula: the transmittance (%) of the switching mirror panel in the transparent mode=100× L2/L1. The luminance L1 and luminance L2 were measured under the environment with an illuminance of 0 lx using a spectroradiometer (trade name: SR-UL1) available from Topcon Corporation. Visually corrected Y value was taken as the luminance.

(Evaluation Results)

Table 1 shows the evaluation results. As shown in Table 1, the transmittance of the switching mirror panel in the transparent mode (simply referred to as transmittance in Table 1) in Examples 1 to 4 was equal to or better than that in Comparative Example 1. This means that the switching mirror devices in the display mode of Examples 1 to 4 achieved brighter display than that in Comparative Example 1. Additionally, all of the switching mirror panels in the transparent mode of Examples 1 to 4 had a transmittance of higher than 70%, which was sufficiently higher than the transmittance (50% or lower) of a typical mirror display including a half mirror layer.

TABLE 1

|  | Transmittance (%) |
| --- | --- |
| Example 1 | 78.5 |
| Example 2 | 80.5 |
| Example 3 | 85.6 |
| Example 4 | 85.7 |
| Comparative Example 1 | 78.6 |

[Evaluation 6]

The luminance was measured in the switching mirror devices of Examples 4 and 5.

(Evaluation Method)

The switching mirror device of each example was separated into the liquid crystal panel of the switching mirror panel, a laminate in which the backlight was excluded from the liquid crystal display device (laminate including the absorptive polarizing plate, the liquid crystal panel for display, and the absorptive polarizing plate), and the backlight. Next, the laminate and the liquid crystal panel of the switching mirror panel were placed in the stated order on the front surface side of the backlight to produce a sample for evaluation. Then, the liquid crystal panel of the switching mirror panel was brought to the state with no voltage applied (the state where sufficient voltage is not applied so as to prevent birefringence) and the luminance of the sample for evaluation was measured from the front surface side. The luminance was measured under the environment with an illuminance of 0 lx using a spectroradiometer (trade name: SR-UL1) available from Topcon Corporation. Visually corrected Y value was taken as the luminance.

(Evaluation Results)

Table 2 shows evaluation results. As shown in Table 2, the luminance (simply referred to as luminance in Table 2) in Example 5 was higher than that in Example 4. This is because the main transmittance k1 (89%) of the absorptive polarizing plate on the front surface side of the laminate in Example 5 was higher than that (84%) in Example 4. Accordingly, the switching mirror device in the display mode of Example 5 achieved brighter display than that in Example 4.

TABLE 2

|  | Luminance (cd/m$^2$) |
| --- | --- |
| Example 4 | 480.6 |
| Example 5 | 508.6 |

[Evaluation 7]

The switching mirror panels of Example 7 and Reference Example 1 were evaluated for the applied-voltage dependence of the color of transmitted light.

(Evaluation Method)

The switching mirror panel of each example was placed on the front surface side of a backlight. While the voltage applied to all the pixels of the liquid crystal panel of the switching mirror panel of each example was increased by 0.1 V from 0 V to 10 V, the transmission chromaticity of each switching mirror panel was measured and the xy chromaticity was calculated from the measurement results. The transmission chromaticity was measured using a spectroradiometer (trade name: SR-UL1) available from Topcon Corporation under the environment with an illuminance of 0 lx. Changing the voltage applied to the liquid crystal panel from 0 V to 10 V achieved retardation change of the liquid crystal panel from 0 nm to 1090 nm in Example 7 and from 0 nm to 1090 nm in Reference Example 1, when measured with light having a wavelength of 550 nm.

(Evaluation Results)

Figure 16:
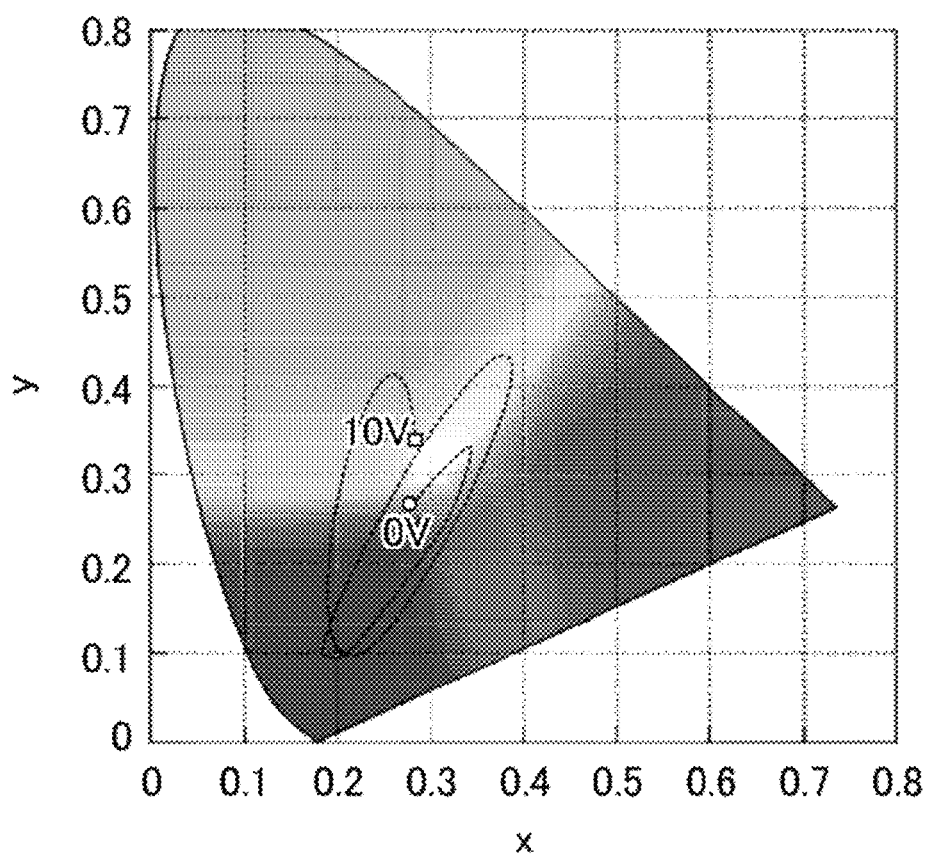
FIG. 16 is an xy chromaticity diagram derived from the measurement results of the transmission chromaticity of a switching mirror panel of Example 7.
Figure 17:
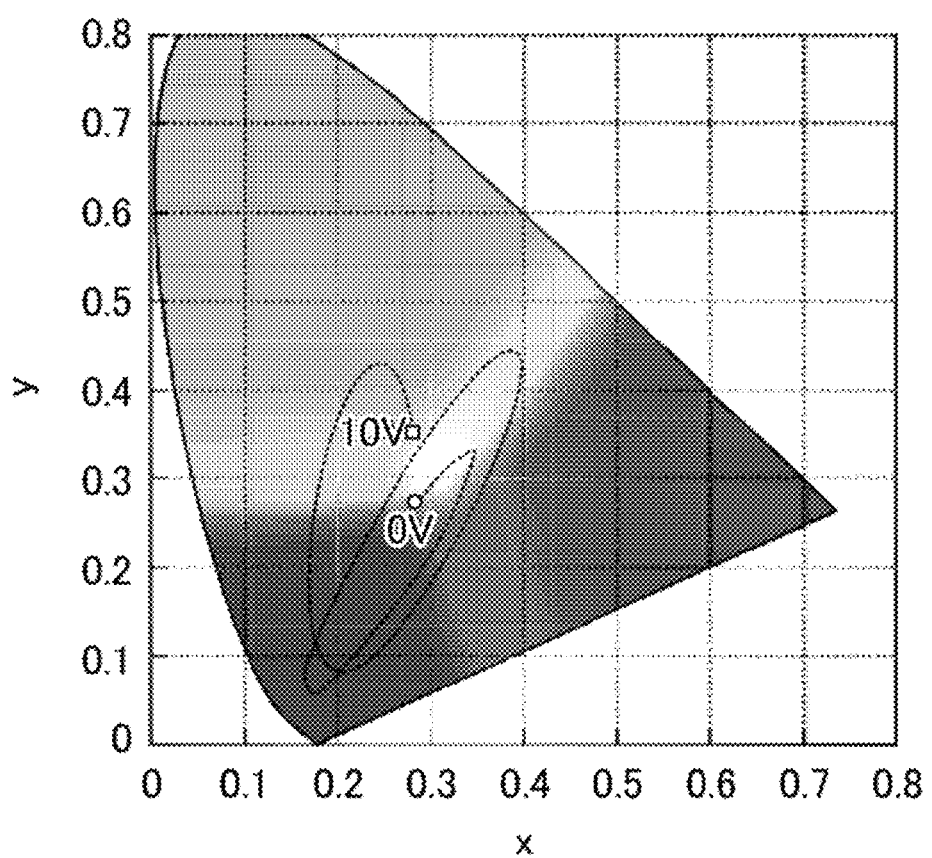
FIG. 17 is an xy chromaticity diagram derived from the measurement results of the transmission chromaticity of a switching mirror panel of Reference Example 1.

FIG. 16 is an xy chromaticity diagram derived from the measurement results of the transmission chromaticity of a switching mirror panel of Example 7. FIG. 17 is an xy chromaticity diagram derived from the measurement results of the transmission chromaticity of a switching mirror panel of Reference Example 1. In FIGS. 16 and 17, "○" (white circle) indicates the chromaticity point representing the transmission chromaticity with a voltage of 0 V applied to the liquid crystal panel; and "□" (white square) indicates the chromaticity point representing the transmission chromaticity with a voltage of 10 V applied to the liquid crystal panel. Changing the voltage applied to the liquid crystal panel from 0 V to 10 V moves the chromaticity point from "○" to "□" along the dotted line. FIGS. 16 and 17 showed that the color of transmitted light in Example 7 and Reference Example 1 varied in accordance with applied voltage. Here, the switching mirror panel of Reference Example 1 cannot use incident light from the front surface side of the absorptive polarizing plate 204b. Thus, the switching mirror panel of Reference Example 1, when used with the back surface side (the absorptive polarizing plate 204a side) faced to the ground, for example, provides darker display than the switching mirror panel of Example 7. In contrast, the switching mirror panel of Example 7, even when used with the back surface side (the reflective polarizing plate 2 side) faced to the ground, achieves color display by reflecting incident light from the front surface side of the absorptive polarizing plate 4. Accordingly, the switching mirror panel of Example 7 achieves better display visibility under more various environments than the switching mirror panel of Reference Example 1.

[Evaluation 8]

The switching mirror devices of Examples 4, 10, and 11 were evaluated for the strength of a moiré pattern.

(Evaluation Method)

In the switching mirror device of each example, the liquid crystal panel for display of the liquid crystal display device was operated to provide white display. Then, under the environment with an illuminance of 0 lx (dark room), ten viewers visually observed the switching mirror device of each example from the front surface side through one of ND filters with different transmittances (minimum transmittance: 0.1%) to evaluate the strength of a moiré pattern. The transmittance of the ND filter at which the moiré pattern was lost was recorded. A higher transmittance at which the moiré pattern was lost was evaluated as preventing moiré appearance better (the moiré pattern was weaker).

(Evaluation Results)

Table 3 shows the evaluation results. As shown in Table 3, a moiré pattern was still observed with an ND filter with the minimum transmittance of 0.1% (referred to as "<0.1" (less than 0.1%) in Table 3) in Example 4. In contrast, a moiré pattern was lost with an ND filter with a transmittance of 1.4% in Example 10, and a moiré pattern was lost with an ND filter with a transmittance of 20% in Example 11. Namely, the switching mirror panels of Examples 10 and 11 achieved better prevention of moiré appearance than that in Example 4.

TABLE 3

|  | Transmittance (%) of ND filter at which moire pattern is lost |
|---|---|
| Example 4 | <0.1 |
| Example 10 | 1.4 |
| Example 11 | 20 |

[Additional Remarks]

An aspect of the present invention may be a switching mirror panel including, in the following order from the back surface side to the front surface side: a reflective polarizing plate; a liquid crystal panel including a pair of substrates facing each other and a liquid crystal layer disposed between the substrates; and an absorptive polarizing plate, at least one of the substrates including divided pixel regions, the pixel regions each including, in the following order from the liquid crystal layer side, a pixel electrode, a transparent insulating film, and transparent conductive lines superimposed on the pixel electrode, the pixel electrode being electrically connected to at least one of the transparent conductive lines through an aperture formed in the transparent insulating film, the switching mirror panel being configured to switch between a transparent mode of transmitting light incident on the reflective polarizing plate from the back surface side through the absorptive polarizing plate and a mirror mode of reflecting light incident on the absorptive polarizing plate from the front surface side by the reflective polarizing plate by applying voltage to the pixel electrode to control the alignment of liquid crystal molecules in the liquid crystal layer.

This configuration achieves the below effects.

(1) Information such as letters and images can be displayed by reflected light in the mirror mode.

(2) The arrangement in which the transparent conductive lines are superimposed on the pixel electrodes enables efficient arrangement of the transparent conductive lines and reduced spaces between the pixel regions (the pixel electrodes). This configuration enables the pixel regions (pixel electrodes) to be recognized as if they constituted one integrated region, thereby enhancing the specularity in the mirror mode.

(3) Using not metal conductive lines but the transparent conductive lines enhances the transmittance of the switching mirror panel.

The transparent conductive lines may have an equal length. The pixel regions may include an equal number of the transparent conductive lines. This configuration enables the transparent conductive lines to have an equal parasitic capacitance. When an equal voltage is applied to the transparent conductive lines, the pixel regions (pixel electrodes) have an equal potential. This achieves a uniform mirror surface without irregular reflection in the mirror mode.

The switching mirror panel may further include, between the pixel electrode and the transparent insulating film in the following order from the liquid crystal layer side, an additional transparent insulating film and additional transparent conductive lines superimposed on the pixel electrode, and the transparent conductive lines and the additional transparent conductive lines, with the transparent insulating film in between, may be placed at an equal pitch and may not be superimposed on each other. This configuration can sufficiently prevent moiré appearance and increase the number of pixel electrodes that can drive, imparting high definition to the liquid crystal panel.

The liquid crystal panel may be a birefringence mode liquid crystal panel. This configuration enables use of the present invention when a birefringence mode liquid crystal panel is used as the liquid crystal panel.

When the liquid crystal panel is a birefringence mode liquid crystal panel, the transmission axis of the reflective polarizing plate and the transmission axis of the absorptive polarizing plate may be parallel to each other. The transmission axis of the reflective polarizing plate and the transmission axis of the absorptive polarizing plate may be perpendicular to each other. In order to enhance the transmittance of the switching mirror panel in the transparent mode, the transmission axis of the reflective polarizing plate and the transmission axis of the absorptive polarizing plate are preferably parallel to each other.

The birefringence mode liquid crystal panel may be configured to switch, in transmission of incident polarized light, between a non-coloring mode of not altering the polarization state of the polarized light and a coloring mode of altering the polarization state of the polarized light, and in the coloring mode, the birefringence mode liquid crystal panel may change the retardation to a value greater than 275 nm when measured with light having a wavelength of 550 nm. This configuration enables color adjustment of reflected light in the mirror mode and of transmitted light passing through the switching mirror panel from the back surface side in the transparent mode.

The liquid crystal panel may be an optical rotation mode liquid crystal panel. This configuration enables use of the present invention when an optical rotation mode liquid crystal panel is used as the liquid crystal panel.

When the liquid crystal panel is an optical rotation mode liquid crystal panel, the transmission axis of the reflective polarizing plate and the transmission axis of the absorptive polarizing plate may be perpendicular to each other. The transmission axis of the reflective polarizing plate and the transmission axis of the absorptive polarizing plate may be parallel to each other. From the viewpoint of enhancing the transmittance of the switching mirror panel in the transparent mode, the transmission axis of the reflective polarizing plate and the transmission axis of the absorptive polarizing plate are preferably perpendicular to each other.

Another aspect of the present invention may be a switching mirror device including, in the following order from the back surface side to the front surface side, a display device including a polarizing plate and the switching mirror panel. This configuration enables the switching mirror panel to switch between the state (transparent mode) of displaying an image of the display device and the state (mirror mode) of displaying information such as letters and images by reflected light.

The display device may be a liquid crystal display device. This configuration enables use of the present invention when a liquid crystal display device is used as the display device.

Any display device including a polarizing plate may be used and examples thereof include, in addition to a liquid crystal display device, display devices emitting polarized light such as an organic electroluminescent display device including an antireflection absorptive circularly polarizing plate and a MEMS display to which a polarizing plate is attached. The display device may also be a display providing three-dimensional (3D) video images, i.e., a 3D compatible display. A 3D compatible display can provide natural sense of depth in the display region as well as the mirror region, which enhances the designability of the switching mirror device and enables use of the switching mirror device in various applications. Any display style providing three-dimensional video images may be employed for the 3D compatible display, and preferred are naked-eye displays which do not require glasses. Examples of the naked-eye 3D compatible displays include displays with lenticular lenses and displays with parallax barriers.

The polarizing plate used in the display device is an absorptive polarizing plate or a reflective polarizing plate, not any other special polarizing plates. The absorptive polarizing plate and the reflective polarizing plate include a linearly polarizing plate and a circularly polarizing plate (a product in which a λ/4 plate is stacked on a linearly polarizing plate), respectively. A linearly polarizing plate that belongs to the absorptive polarizing plate is typically referred to as an absorptive polarizing plate ("linear" is omitted), for example. Meanwhile, a circularly polarizing plate that belongs to the absorptive polarizing plate may be referred to as an absorptive circularly polarizing plate.

Another aspect of the present invention may be a switching mirror device including, in the following order from the back surface side to the front surface side, a light absorber and the switching mirror panel. This configuration enables the switching mirror panel to switch between the state (transparent mode) of displaying the light absorber and the state (mirror mode) of displaying information such as letters and images by reflected light.

Another aspect of the present invention may be a switching mirror device including, in the following order from the back surface side to the front surface side, a display device, a light absorber, and the switching mirror panel, the display device including a display surface on the opposite side of the light absorber. This configuration enables the switching mirror panel to switch, on the opposite side of the display surface of the display device, between the state (transparent mode) of displaying the light absorber and the state (mirror mode) of displaying information such as letters and images by reflected light.

REFERENCE SIGNS LIST 1a, 1b, 1c, 101a, 101b, 201: switching mirror panel
2, 102: reflective polarizing plate
3, 3a, 103a, 103b, 203: liquid crystal panel
4, 4a, 4b, 104, 104a, 104b, 204a, 204b: absorptive polarizing plate
5, 5a, 105a, 105b, 205: array substrate
6, 106, 206: liquid crystal layer
7, 107, 207: counter substrate
8a, 8b, 108a, 108b, 208a, 208b: transparent substrate
9, 9a, 109, 209: transparent conductive line
10, 10a, 110, 210: transparent insulating film
11, 111, 211: pixel electrode
12, 112, 212: contact part
13, 113, 213: common electrode
14, 114: integrated circuit
15, 115: flexible printed circuit board
16, 116: drive circuit
17a, 17b, 17c, 17d, 17e, 17f, 117a, 117b: switching mirror device
18, 118: liquid crystal display device
19, 119: backlight
20, 120: liquid crystal panel for display
21: light absorber
22: pressure-sensitive adhesive
PR, Pr: pixel region

The invention claimed is:

1. A switching mirror panel comprising, in the following order from the back surface side to the front surface side:
a reflective polarizing plate;
a liquid crystal panel including a pair of substrates facing each other and a liquid crystal layer disposed between the substrates; and
an absorptive polarizing plate,
at least one of the substrates including divided pixel regions,
the pixel regions each including, in the following order from the liquid crystal layer side, a pixel electrode, a transparent insulating film, and transparent conductive lines superimposed on the pixel electrode,
the pixel electrode being electrically connected to at least one of the transparent conductive lines through an aperture formed in the transparent insulating film,
the switching mirror panel being configured to switch between a transparent mode of transmitting light incident on the reflective polarizing plate from the back surface side through the absorptive polarizing plate and a mirror mode of reflecting light incident on the absorptive polarizing plate from the front surface side by the reflective polarizing plate by applying voltage to the pixel electrode to control the alignment of liquid crystal molecules in the liquid crystal layer,
wherein the switching mirror panel further comprises, between the pixel electrode and the transparent insulating film in the following order from the liquid crystal layer side, an additional transparent insulating film and additional transparent conductive lines superimposed on the pixel electrode, and
the transparent conductive lines and the additional transparent conductive lines, with the transparent insulating film in between, are placed at an equal pitch and are not superimposed on each other.

2. The switching mirror panel according to claim 1, wherein the transparent conductive lines have an equal length.

3. The switching mirror panel according to claim 2, wherein the pixel regions include an equal number of the transparent conductive lines.

4. The switching mirror panel according to claim 1, wherein the liquid crystal panel is a birefringence mode liquid crystal panel.

5. The switching mirror panel according to claim 4, wherein the transmission axis of the reflective polarizing plate and the transmission axis of the absorptive polarizing plate are parallel to each other.

6. The switching mirror panel according to claim 4, wherein the transmission axis of the reflective polarizing plate and the transmission axis of the absorptive polarizing plate are perpendicular to each other.

7. The switching mirror panel according to claim 4, wherein the birefringence mode liquid crystal panel is configured to switch, in transmission of incident polarized light, between a non-coloring mode of not altering the polarization state of the polarized light and a coloring mode of altering the polarization state of the polarized light, and
in the coloring mode, the birefringence mode liquid crystal panel changes the retardation to a value greater than 275 nm when measured with light having a wavelength of 550 nm.

8. The switching mirror panel according to claim 1, wherein the liquid crystal panel is an optical rotation mode liquid crystal panel.

9. The switching mirror panel according to claim 8, wherein the transmission axis of the reflective polarizing plate and the transmission axis of the absorptive polarizing plate are perpendicular to each other.

10. The switching mirror panel according to claim 8, wherein the transmission axis of the reflective polarizing plate and the transmission axis of the absorptive polarizing plate are parallel to each other.

11. A switching mirror device comprising, in the following order from the back surface side to the front surface side:
a display device including a polarizing plate; and
the switching mirror panel according to claim 1.

12. The switching mirror device according to claim 11, wherein the display device is a liquid crystal display device.

13. A switching mirror device comprising, in the following order from the back surface side to the front surface side:
a light absorber; and
the switching mirror panel according to claim 1.

14. A switching mirror device comprising, in the following order from the back surface side to the front surface side:
a display device;
a light absorber; and
the switching mirror panel according to claim 1,
the display device including a display surface on the opposite side of the light absorber.

* * * * *